United States Patent
Patchava et al.

(10) Patent No.: US 12,155,593 B2
(45) Date of Patent: Nov. 26, 2024

(54) DEMODULATION REFERENCE SIGNAL PRECODING IN HIGH-DOPPLER SCENARIOS

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 17/528,100

(22) Filed: Nov. 16, 2021

(65) Prior Publication Data
US 2023/0155761 A1    May 18, 2023

(51) Int. Cl.
*H04L 5/00* (2006.01)
*H04L 25/02* (2006.01)
*H04L 27/26* (2006.01)

(52) U.S. Cl.
CPC ........ *H04L 5/0048* (2013.01); *H04L 25/0222* (2013.01); *H04L 27/2613* (2013.01); *H04L 27/2639* (2013.01); *H04L 27/26532* (2021.01)

(58) Field of Classification Search
None
See application file for complete search history.

(56) References Cited

U.S. PATENT DOCUMENTS

| | | | |
|---|---|---|---|
| 2017/0078054 A1* | 3/2017 | Hadani | H04L 5/0023 |
| 2018/0302905 A1* | 10/2018 | Fodor | H04L 27/262 |
| 2020/0367252 A1* | 11/2020 | Hebron | H04L 5/0007 |
| 2022/0311489 A1* | 9/2022 | Rakib | H04L 25/0226 |
| 2022/0321181 A1* | 10/2022 | Hadani | H04B 7/024 |
| 2022/0352933 A1* | 11/2022 | Rakib | H04L 5/0023 |
| 2022/0408443 A1* | 12/2022 | Hebron | H04L 5/0007 |

\* cited by examiner

*Primary Examiner* — Phirin Sam
(74) *Attorney, Agent, or Firm* — Holland & Hart LLP

(57) ABSTRACT

This disclosure provides systems, methods and apparatus, including computer programs encoded on computer storage media, for demodulation reference signal (DMRS) precoding in high-Doppler scenarios. In some aspects, communicating devices may support different precodings for different portions of a signal, such as for a DMRS portion and an information portion. For example, a device may receive a signal including an orthogonal time-frequency space (OTFS) precoded first waveform portion carrying DMRS symbols and an orthogonal frequency division multiplexing (OFDM) precoded second waveform portion carrying information symbols. The device may transform the OTFS precoded DMRS symbols from a time-frequency domain to a delay-Doppler domain, may use the DMRS symbols to estimate a delay-Doppler channel, and may use the delay-Doppler channel estimate to measure an inter-carrier interference (ICI). The receiving device may use the ICI measurement to receive the information symbols carried by the OFDM precoded second waveform portion.

30 Claims, 11 Drawing Sheets

DEMODULATION REFERENCE SIGNAL PRECODING IN HIGH-DOPPLER SCENARIOS

TECHNICAL FIELD

This disclosure relates to wireless communications, including demodulation reference signal (DMRS) precoding in high-Doppler scenarios.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a first device. The method may include receiving, from a second device, control signaling indicating a use of orthogonal time-frequency space (OTFS) precoding for a set of multiple demodulation reference signal (DMRS) symbols and receiving, from the second device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in an apparatus for wireless communications at a first device. The apparatus may include an interface and a processing system. The interface may be configured to obtain, from a second device, control signaling indicating a use of OTFS precoding for a set of multiple DMRS symbols and obtain, from the second device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in an apparatus for wireless communications at a first device. The apparatus may include a processor, memory coupled with the processor, and instructions stored in the memory. The instructions may be executable by the processor to cause the apparatus to receive, from a second device, control signaling indicating a use of OTFS precoding for a set of multiple DMRS symbols and receive, from the second device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in another apparatus for wireless communications at a first device. The apparatus may include means for receiving, from a second device, control signaling indicating a use of OTFS precoding for a set of multiple DMRS symbols and means for receiving, from the second device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in a non-transitory computer-readable medium storing code for wireless communications at a first device. The code may include instructions executable by a processor to receive, from a second device, control signaling indicating a use of OTFS precoding for a set of multiple DMRS symbols and receive, from the second device and associated with the control signaling, a signal including an OTFS precoded first waveform portion carrying the set of multiple DMRS symbols interleaved with a non-OTFS precoded second waveform portion carrying a set of multiple information symbols.

In some implementations of the method, apparatuses, and non-transitory computer-readable medium described herein, receiving the control signaling may include operations, features, means, or instructions for receiving an indication of a time dimension and a frequency dimension associated with DMRS resources, where the DMRS resources define the OTFS precoded first waveform portion in a time-frequency domain.

In some implementations of the method, apparatuses, and non-transitory computer-readable medium described herein, the time dimension and the frequency dimension correspond to a comb structure of uniformly spaced subcarriers in a frequency-domain and uniformly spaced symbols in a time-domain within the signal.

Some implementations of the method, apparatuses, and non-transitory computer-readable medium described herein may further include operations, features, means, or instructions for performing OTFS decoding of the OTFS precoded first waveform portion via a symplectic Fast Fourier transform (SFFT), where the OTFS decoding of the OTFS precoded first waveform portion transforms the set of multiple DMRS symbols from the time-frequency domain to a delay-Doppler domain.

Some implementations of the method, apparatuses, and non-transitory computer-readable medium described herein may further include operations, features, means, or instructions for receiving the set of multiple information symbols from the second device in accordance with a delay-Doppler domain channel estimate associated with the set of multiple DMRS symbols in the delay-Doppler domain, where the set of multiple information symbols include one or both of data and control signals.

One innovative aspect of the subject matter described in this disclosure can be implemented in a method for wireless communications at a second device. The method may include transmitting, to a first device, control signaling indicating a use of OTFS precoding for a set of multiple DMRS symbols and transmitting, to the first device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in an apparatus for wireless communications at a second device. The apparatus may include an interface and a processing system. The interface may be configured to output, to a first device, control signaling indicating a use of OTFS precoding for a set of multiple DMRS symbols and output, to the first device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in an apparatus for wireless communications at a second device. The apparatus may include a processor, memory coupled with the processor, and instructions stored in the memory. The instructions may be executable by the processor to cause the apparatus to transmit, to a first device, control signaling indicating a use of OTFS precoding for a set of multiple DMRS symbols and transmit, to the first device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in another apparatus for wireless communications at a second device. The apparatus may include means for transmitting, to a first device, control signaling indicating a use of OTFS precoding for a set of multiple DMRS symbols and means for transmitting, to the first device and associated with the control signaling, a signal including an OTFS precoded first waveform portion carrying the set of multiple DMRS symbols interleaved with a non-OTFS precoded second waveform portion carrying a set of multiple information symbols.

Another innovative aspect of the subject matter described in this disclosure can be implemented in a non-transitory computer-readable medium storing code for wireless communications at a second device. The code may include instructions executable by a processor to transmit, to a first device, control signaling indicating a use of OTFS precoding for a set of multiple DMRS symbols and transmit, to the first device and associated with the control signaling, a signal including an OTFS precoded first waveform portion carrying the set of multiple DMRS symbols interleaved with a non-OTFS precoded second waveform portion carrying a set of multiple information symbols.

In some implementations of the method, apparatuses, and non-transitory computer-readable medium described herein, transmitting the control signaling may include operations, features, means, or instructions for transmitting an indication of a time dimension and a frequency dimension associated with DMRS resources, where the DMRS resources define the OTFS precoded first waveform portion in a time-frequency domain.

In some implementations of the method, apparatuses, and non-transitory computer-readable medium described herein, the time dimension and the frequency dimension correspond to a comb structure of uniformly spaced subcarriers in a frequency-domain and uniformly spaced symbols in a time-domain within the signal.

Some implementations of the method, apparatuses, and non-transitory computer-readable medium described herein may further include operations, features, means, or instructions for performing OTFS encoding of the set of multiple DMRS symbols via an inverse symplectic Fast Fourier transform (ISFFT), where the OTFS encoding of the set of multiple DMRS symbols transforms the set of multiple DMRS symbols from a delay-Doppler domain to the time-frequency domain to obtain the OTFS precoded first waveform portion.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
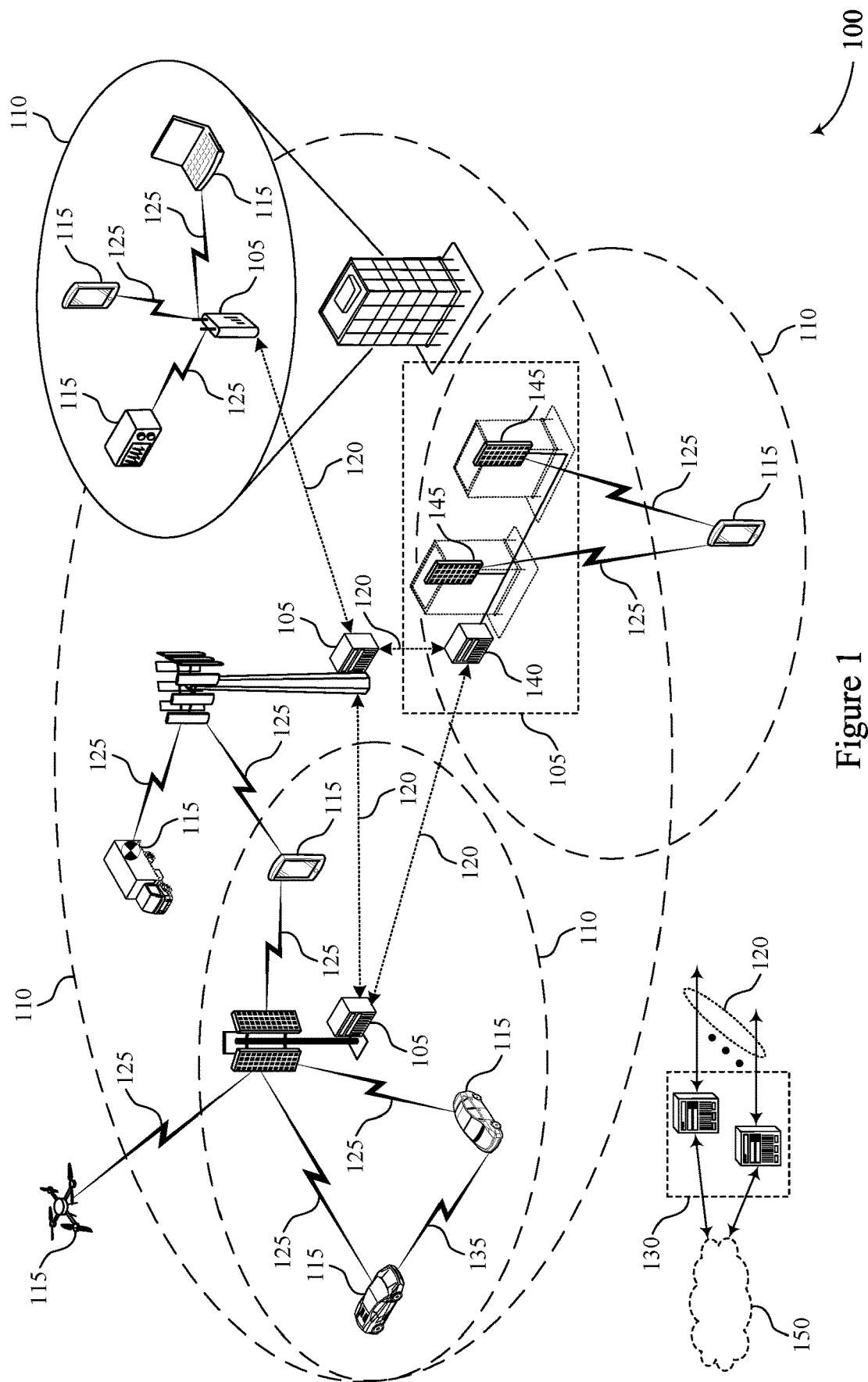
FIG. 1 shows an example wireless communications system that supports demodulation reference signal (DMRS) precoding in high-Doppler scenarios.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth R: standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G) or fifth generation (5G), or further implementations thereof, technology.

In some wireless communications systems, a first device, such as a user equipment (UE), may receive a demodulation reference signal (DMRS) multiplexed with data via an orthogonal frequency division multiplexing (OFDM) waveform on a wireless channel. The UE may use (such as measure) the DMRS to estimate a channel for decoding the data received over the channel. Use of an OFDM waveform for DMRS and data may be associated with a specific and inflexible allocation of the DMRS to time and frequency resources. In some scenarios, including when the UE experiences high Doppler spread, the specific and inflexible resource allocation for DMRS in OFDM may inhibit the UE from accurately estimating the channel.

In some implementations of the present disclosure, and to support accurate channel estimation in high Doppler spread scenarios, communicating devices may support levels and types of precoding for different portions of a signal, such as a first precoding type for a DMRS portion of the signal and a second precoding type for an information portion of the signal. For example, a second device, such as a network entity or one or more components of a base station (BS), may perform an orthogonal time-frequency space (OTFS) precoding for the DMRS portion of the signal but not for the information portion of the signal. To support an OTFS precoding for the DMRS portion, the network entity may allocate a set of DMRS symbols to a delay-Doppler domain and may perform an inverse symplectic fast Fourier transform (ISFFT) on the DMRS symbols to transform the DMRS symbols to a time-frequency domain. The network entity may allocate a set of information symbols to remaining resources within a resource allocation in the time-frequency domain and may transmit the signal to the UE. The UE may receive the signal and, in some implementations, may perform a symplectic fast Fourier transform (SFFT) on the time-frequency resources to which the DMRS symbols are allocated to transform the DMRS symbols back to the delay-Doppler domain. An ISFFT or an SFFT may be equivalently referred to or understood as a sparse or simple inverse fast Fourier transform (IFFT) or fast Fourier transform (FFT), respectively. The UE may estimate a delay-Doppler channel using the DMRS symbols in the delay-Doppler domain and may use the delay-Doppler channel estimate to receive and decode the information symbols carried by the signal.

Particular implementations of the subject matter described in this disclosure can be implemented to realize one or more of the following potential advantages. For example, as a result of performing an ISFFT on the DMRS symbols, each DMRS symbol may occupy an entire time duration and bandwidth that is allocated for the signal, which may provide the UE with more resources over which to estimate the channel (even in high Doppler spread scenarios). Further, the delay-Doppler channel may be sparse and may occupy a relatively small portion or fraction of a delay-Doppler resource grid, which may support or be associated with delay or Doppler spreads that are smaller (including some which may be much smaller) than a symbol duration and a subcarrier spacing, respectively. As such, the UE may more accurately measure the delay and Doppler spreads of the channel, which may support a more accurate estimation of the channel by the UE. Further, in accordance with using a delay-Doppler channel, the UE may more accurately measure or compute inter-carrier interference (ICI) that occurs in data channels, which may enable more successful data detection. As a result of a more accurate estimation of the channel and more successful data detection, the UE may have a greater reliability in successfully receiving and decoding the information symbols carried by the signal, which may support greater spectral efficiency, higher data rates, and increased system capacity, among other benefits, across various and diverse deployment scenarios (including scenarios associated with high Doppler spreads).

FIG. 1 shows an example wireless communications system 100 that supports DMRS precoding in high-Doppler scenarios. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a nextgeneration NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as OFDM or discrete Fourier transform spread OFDM (DFT-S-OFDM)). In a system employing MCM techniques, a resource element may include one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time-domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time-domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHZ, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (such as LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some systems, such as the wireless communications system 100, a first device, such as a UE 115, may receive a DMRS multiplexed with data via an OFDM waveform and may use (such as measure) the DMRS to estimate a channel for decoding the data. For example, the UE 115 may use a channel estimate for decoding the data to increase the likelihood that the UE 115 is able to successfully decode the data. Use of an OFDM waveform for DMRS and data may be associated with a specific and inflexible allocation of the DMRS to time and frequency resources and, in some scenarios (such as scenarios associated with high Doppler spread), such a specific and inflexible allocation may inhibit an ability of the UE 115 to accurately estimate the channel.

To support accurate channel estimation in high Doppler spread scenarios, communicating devices may support different precodings for different portions of a signal, such as a first precoding type for a DMRS portion of the signal and a second precoding type for an information portion of the signal. For example, a second device, such as a network entity or one or more components of a BS 105, may perform an OTFS precoding for the DMRS portion of the signal, but may refrain from performing an OTFS precoding for the information portion of the signal. To support an OTFS precoding for the DMRS portion, one or more components of the BS 105 may allocate a set of DMRS symbols to a delay-Doppler domain and may perform an ISFFT on the DMRS symbols to transform the DMRS symbols to a time-frequency domain.

One or more components of the BS 105 may allocate a set of information symbols to remaining resources within a resource allocation in the time-frequency domain and one or more components of the BS 105 may transmit the signal to the UE 115. The UE 115 may receive the signal and, in some implementations, may perform a SFFT on the time-frequency resources to which the DMRS symbols are allocated to transform the DMRS symbols back to the delay-Doppler domain. The UE 115 may estimate a delay-Doppler channel using the DMRS symbols in the delay-Doppler domain and may use the delay-Doppler channel estimate to receive and decode the information symbols carried by the signal. For example, the UE 115 may measure or estimate an interference metric, such as an inter-carrier interference (ICI) metric, associated with the channel using the delay-Doppler channel estimate and may use the measured or estimated interference metric to receive and decode the information symbols.

As described herein, precoding may refer to one or more signal processing tasks associated with adjusting a signal to improve a resiliency or robustness of the signal to interference, such as ICI, inter-symbol interference, or inter-channel interference. In some aspects, precoding may involve one or more allocations or transformations of one or more symbols, or of sequences associated with one or more symbols, between different domains. Additional details relating to the OTFS precoding described herein are illustrated by and described with reference to FIGS. 3, 5 and 6.

Figure 2:
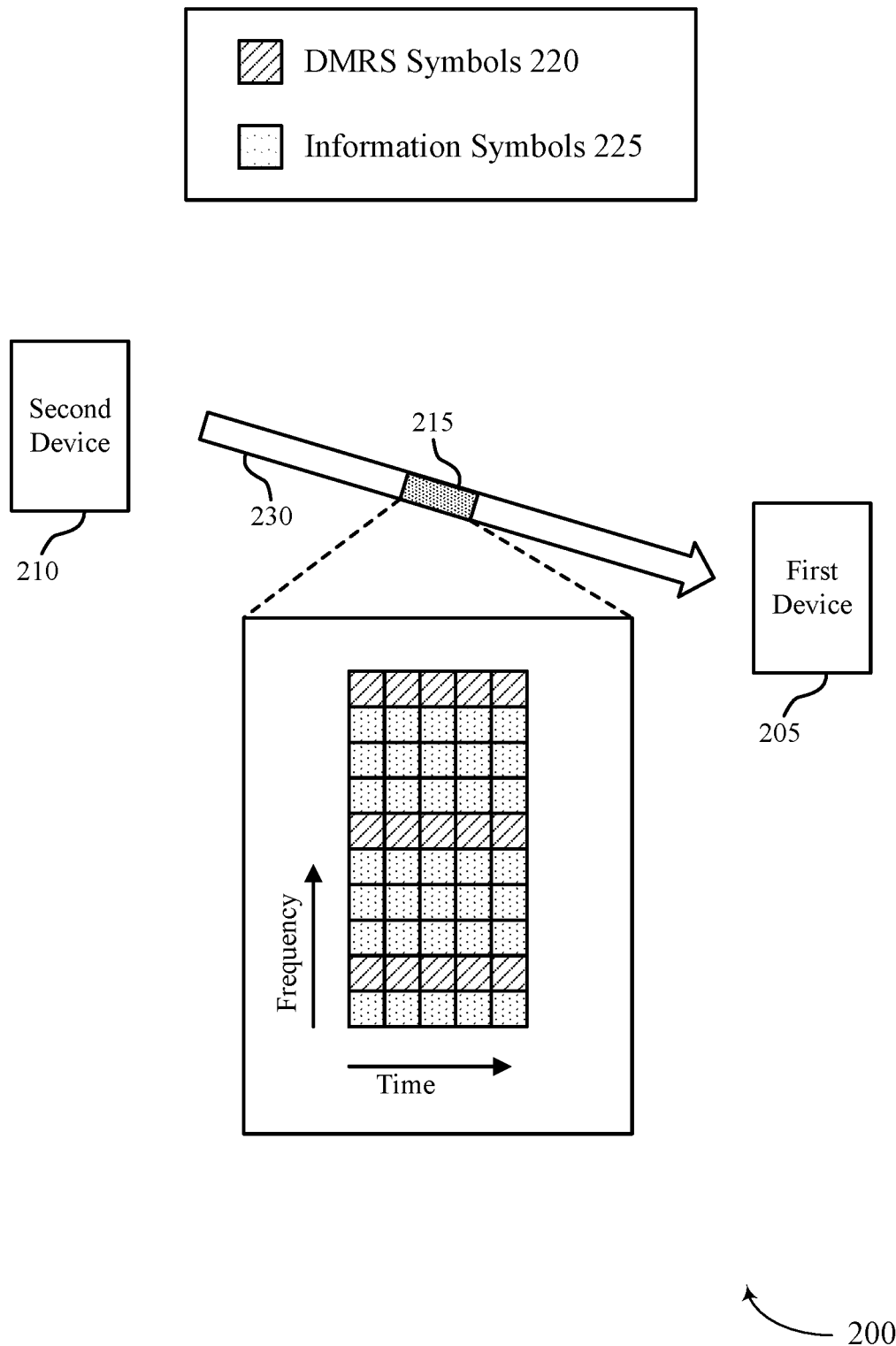
FIG. 2 shows an example signaling diagram that supports DMRS precoding in high-Doppler scenarios.

FIG. 2 shows an example signaling diagram 200 that supports DMRS precoding in high-Doppler scenarios. The signaling diagram 200 may implement or be implemented to realize aspects of the wireless communications system 100. For example, the signaling diagram 200 illustrates communication between a first device 205 and a second device 210 via a communication link 230, and the first device 205 and the second device 210 may be examples of one or more devices as described with reference to FIG. 1. The first device 205 may be an example of a UE 115, one or more components of a BS 105, a TRP, a small cell, a sidelink device, or any other device that is capable of receiving a signal 215 including a set of DMRS symbols 220 and a set of information symbols 225. The second device 210 may be an example of a UE 115, one or more components of a BS 105, a TRP, a small cell, a sidelink device, or any other device that is capable of transmitting the signal 215 including the set of DMRS symbols 220 and the set of information symbols 225.

In some systems, a first device 205 may receive a DMRS multiplexed with data via an OFDM waveform and may use (such as measure) the DMRS to estimate a channel for decoding the data. For example, the first device 205 may use the estimate of the channel for equalization of the data (such as to reverse a distortion incurred by the data transmitted through the channel). In some aspects, use of an OFDM waveform for DMRS and data may be associated with or result in a specific, and potentially rigid or inflexible, allocation of time and frequency resources. For example, a DMRS structure for a downlink data channel, such as a physical downlink shared channel (PDSCH), in OFDM may allow for two configurations and mapping types. For example, DMRS may occupy two different portions (including non-limiting examples such as (approximately) 33% or 50%) of a total quantity of allocated resources in a frequency-domain. Further, DMRS may occupy an upper limit (such as up to a maximum) of four symbols (such as four symbols per slot) in a time-domain.

In some scenarios, such a specific allocation of DMRS to time and frequency resources may inhibit an accurate estimation of the channel by the first device 205. For example, in scenarios in which the first device 205 is in a high mobility state or otherwise in a high Doppler spread scenario, such as scenarios in which the first device 205 is located on a high speed train (HST: which may have speeds of up to 500 kilometers per hour), the first device 205 may not have sufficient resources over which to measure the DMRS. For example, the first device 205 may equalize high Doppler channel effects in the frequency-domain with an accurate estimation of interference, such as ICI or one or more other sources of interference, but the first device 205 may experience difficulty in estimating, measuring, or otherwise calculating interference from channel estimations obtained from frequency-domain measurements in high mobility or high Doppler spread scenarios. Further, a total quantity of symbols allocated for DMRS, which may be four symbols, may be insufficient to track highly varying channel conditions, as may be common in high mobility or high Doppler spread scenarios.

In some implementations, and to support an accurate channel measurement or estimation (including an interference, such as an ICI, measurement or estimation), the first device 205 and the second device 210 may support OTFS precoded DMRS symbols 220 for OFDM with a set of information symbols 225. For example, the first device 205 and the second device 210 may support a use of an OTFS precoding for DMRS symbols 220 of a signal 215 and not for information symbols 225 of the signal 215. As such, the second device 210 may transmit the signal 215 including an OTFS precoded first waveform portion carrying the DMRS symbols 220 and a non-OTFS precoded second waveform portion (such as a waveform portion that is exclusively associated with OFDM) carrying the information symbols 225. In some aspects, the OTFS precoded first waveform portion may be interleaved with the non-OTFS precoded second waveform portion.

To support an OTFS precoding for the DMRS symbols 220, the second device 210 may place a sequence associated with the DMRS symbols 220, which may be or include a Zadoff-Chu (ZC) sequence or a pseudonoise (PN) sequence, in a set of DMRS resources in a delay-Doppler domain of dimensions $\tilde{M} \times \tilde{N}$ (such as $\tilde{M}$ units in a delay domain and $\tilde{N}$ units in a Doppler domain). The second device 210 may perform the OTFS precoding on the DMRS symbols 220 to transform the DMRS symbols 220 to time-frequency resources of dimensions M×N (such as M subcarriers in the frequency-domain and N symbols in the time-domain) from the set of DMRS resources in the delay-Doppler domain. Similarly, the first device 205 may perform OTFS decoding to transform the DMRS symbols 220 from time-frequency resources of dimensions M×N to the delay-Doppler domain of dimensions $\tilde{M} \times \tilde{N}$. Additional details relating to the precoding and decoding of DMRS symbols 220 in accordance with an OTFS precoding are illustrated by and described with reference to FIGS. 3 and 4.

In some aspects, the first device 205 or the second device 210, or both, may support a DMRS symbol design or pattern in the delay-Doppler domain to enable or support a two-dimensional (2D) correlation at the first device 205 (a receiver). For example, to support OTFS precoding and a 2D correlation (such as a relatively simple 2D correlation or a 2D correlation associated with a relatively low processing cost at the first device 205), the first device 205 or the second device 210, or both, may map values of a DMRS sequence to specific resources in the delay-Doppler domain in accordance with a DMRS symbol design or pattern. A first DMRS symbol design or pattern may be associated with placing values of a DMRS sequence in a single unit in the Doppler domain and across a set of (such as all) units in the delay domain, as illustrated by Table 1. A second DMRS symbol design or pattern may be associated with placing values of a DMRS sequence in a single unit in the delay domain and across a set of (such as all) units in the Doppler domain, as illustrated by Table 2. Each of Tables 1 and 2 may include a quantity of M rows (including a row 0 through a row $\tilde{M}-1$) corresponding to units in the delay domain and N columns (including a row 0 through a row $\tilde{N}-1$) corresponding to units in the Doppler domain and, as such, may illustrate an allocation of the DMRS symbols 220 to DMRS resources in the delay-Doppler domain of dimensions $\tilde{M} \times \tilde{N}$.

TABLE 1

| | | | |
|---|---|---|---|
| ZC[$\tilde{M}$ − 1] | 0 | 0 | 0 |
| ZC[$\tilde{M}$ − 2] | 0 | 0 | 0 |
| . . . | 0 | 0 | 0 |
| . . . | 0 | 0 | 0 |
| . . . | 0 | 0 | 0 |
| ZC[1] | 0 | 0 | 0 |
| ZC[0] | 0 | 0 | 0 |

As shown in Table 1, the first device 205 or the second device 210, or both, may place a sequence corresponding to the DMRS symbols 220 in a first (such as a left-most) column and may place zeros in a remaining quantity of columns associated with the DMRS resources in the delay-Doppler domain. In other words, zero values in Table 1 illustrate delay-Doppler domain resources in which a value of the DMRS sequence is not placed. In such implementations, the first device 205 or the second device 210, or both, may place a first value of the sequence, such as ZC[0], in a table entry corresponding to ($\tilde{M}$=0, $\tilde{N}$=0), may place a second value of the sequence, such as ZC[1], in a table entry corresponding to ($\tilde{M}$=1, $\tilde{N}$=0), and so on until a final value of the sequence, such as ZC[$\tilde{M}$−1], is placed in a table entry corresponding to ($\tilde{M}$=$\tilde{M}$−1, $\tilde{N}$=0). As such, the first device 205 or the second device 210, or both, may place values of the DMRS sequence ZC in Doppler domain unit $\tilde{N}=0$ and across a set of delay domain units $\tilde{N}=[0, \ldots, \tilde{M}-1]$.

TABLE 2

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| ZC[0] | ZC[1] | ... | ... | ZC[$\tilde{N}$ – 2] | ZC[$\tilde{N}$ – 1] |

As shown in Table 2, the first device 205 or the second device 210, or both, may place a sequence corresponding to the DMRS symbols 220 in a first (such as a bottom-most) row and may place zeros in a remaining quantity of rows associated with the DMRS resources in the delay-Doppler domain. In other words, zero values in Table 2 illustrate delay-Doppler domain resources in which a value of the DMRS sequence is not placed. In such implementations, the first device 205 or the second device 210, or both, may place a first value of the sequence, such as ZC[0], in a table entry corresponding to ($\tilde{M}=0$, $\tilde{N}=0$), may place a second value of the sequence, such as ZC[1], in a table entry corresponding to ($\tilde{M}=0$, $\tilde{N}=1$), and so on until a final value of the sequence, such as ZC[$\tilde{N}-1$], is placed in a table entry corresponding to ($\tilde{M}=0$, $\tilde{N}=\tilde{N}-1$). As such, the first device 205 or the second device 210, or both, may place values of the DMRS sequence ZC in delay domain unit $\tilde{M}=0$ and across a set of Doppler domain units $\tilde{N}=[0, \ldots, \tilde{N}-1]$.

The first device 205 may use shifted correlations with ZC or PN sequences to estimate the delay-Doppler channel (such as to measure or obtain a delay-Doppler channel estimate). Further, in some aspects, a selection of the design or pattern (such as which of Table 1 or Table to use in allocated DMRS symbols 220 to the delay-Doppler domain) may be associated with or depend on the values of $\tilde{M}$ and $\tilde{N}$. For example, the first device 205 or the second device 210 may select the design or pattern illustrated by Table 1 if $\tilde{M}$ is greater than $\tilde{N}$ or may select the design or pattern illustrated by Table 2 if $\tilde{N}$ is greater than $\tilde{M}$. As such, the first device 205 or the second device 210 may place the sequence corresponding to the DMRS symbols 220 to support a longest available sequence. Further, although shown as a ZC sequence in Tables 1 and 2, the sequence corresponding to the DMRS symbols 220 may be a PN sequence or any other DMRS sequence.

In some implementations, the first device 205 and the second device 210 may select the dimensions $\tilde{M}$ and $\tilde{N}$ for the DMRS symbols 220 (such as for the DMRS resources in the delay-Doppler domain) in accordance with a criterion or selection rule. For example, a value of $\tilde{M}$ may be associated with or otherwise depend on a maximum delay spread of the channel and a value of $\tilde{N}$ may be associated with or otherwise depend on a maximum Doppler spread of the channel. Additionally, or alternatively, a ratio of $\tilde{M}$ to M (the quantity of subcarriers in the frequency-domain allocated for the signal 215) may be at least a ratio of the maximum delay spread to an OFDM symbol duration. Additionally, or alternatively, a ratio of $\tilde{N}$ to N (the quantity of symbols in the time-domain allocated for the signal 215) may be at least a ratio of the maximum Doppler spread to a subcarrier spacing. Further, to obtain a delay-Doppler domain equation compatible with a time-frequency resource allocation of M×N, the first device 205 and the second device 210 may select values for $\tilde{M}$ and $\tilde{N}$ such that they evenly divide M and N, respectively. In some aspects, different values of $\tilde{M}$ and $\tilde{N}$ may be selected for different users in accordance with their respective channel characteristics.

Further, in some aspects, the first device 205 may receive, from the second device 210, an indication of the DMRS precoding. For example, the second device 210 may transmit control signaling to the first device 205 indicating how the DMRS symbols 220 of the signal 215 are precoded (such as whether the DMRS symbols 220 are OTFS precoded or non-OTFS precoded). For example, a relatively higher speed device may be configured or indicated with an OTFS precoded DMRS while a relatively lower speed device may be configured or indicated with a non-OTFS precoded DMRS. In some implementations, support of an OTFS precoded DMRS may be associated with a device capability and, in such implementations, the first device 205 may transmit an indication of whether the first device 205 supports an OTFS precoded DMRS to the second device 210 via capability signaling. The second device 210 may transmit, to the first device 205, a control message associated with (such as providing information relating to) an OTFS precoded DMRS and indicating the values of M and $\tilde{N}$. The second device 210 may transmit the control message through control signaling, such as through downlink control information (DCI), radio resource control (RRC) signaling, a medium access control (MAC) control element (MAC-CE), or any combination thereof.

In some aspects, such use of an OTFS precoding for DMRS symbols 220 may enable simple interference (such as ICI) measurement or estimation as well as time-varying channel estimation for high Doppler scenarios because each OTFS precoded symbol may occupy an entire time and bandwidth. For example, OTFS may estimate a delay-Doppler channel (as opposed to a time-frequency channel) by placing pilots (such as symbols) in the delay-Doppler domain and OTFS precoding may be associated with an inverse symplectic transform, such as an ISFFT, which may be associated with or otherwise result in each pilot occupying an entire time-frequency plane.

In other words, a delay-Doppler channel may be related to a time-frequency channel through an ISFFT transform and an estimation of the delay-Doppler channel may be associated with one or more advantages relative to the time-frequency channel. For example, a delay-Doppler channel may be sparse, which may be associated with relatively more accurate channel estimation (as compared to congested channels). For further example, a delay-Doppler channel may occupy a relatively small portion of a grid (such as a resource grid), which may be associated with or result in an upper limit or maximum delay spread or Doppler spread of the channel being smaller than (such as much smaller than) a symbol duration and subcarrier spacing (such as less than 20% in each dimension). Additional details relating to OTFS coding, related processing, and channel descriptions or visualizations are illustrated by and described in more detail herein, including with reference to FIGS. 5 and 6.

The signal 215 may be an example of any signal or message sent over a data channel or a control channel, such as a PDSCH, a physical downlink control channel (PDCCH), a physical uplink shared channel (PUSCH), or a physical uplink control channel (PUCCH). As such, the information symbols 225 may refer to or be an example of data symbols or control symbols and the communication link 230 may support any one or more of a PDSCH, a PDCCH, a PUSCH, or a PUCCH. Further, in implementations in which the first device 205 and the second device 210 are peer devices, such as UEs 115, the signal 215 may be an example of any signal or message sent over a sidelink data channel or a sidelink control channel, such as a physical sidelink shared channel (PSSCH) or a physical sidelink control channel (PSCCH).

Further, although described in herein in the context of FFTs and IFFTs, the first device 205 and the second device 210 may perform the implementations described herein using any transform method. For example, the first device 205 may perform the implementations described herein using discrete Fourier transforms (DFTs) and inverse DFTs (IDFTs), among other examples.

Figure 3:
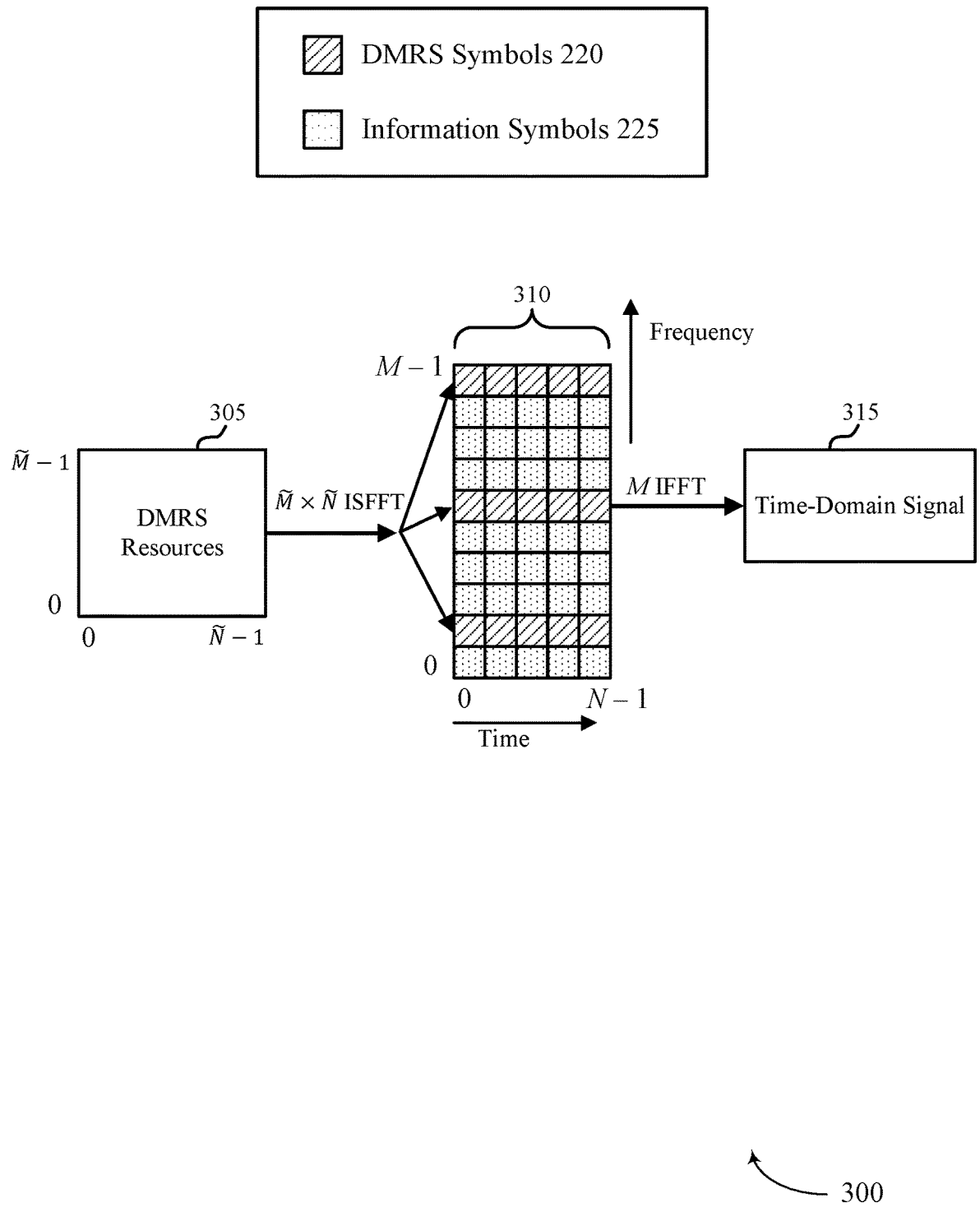
FIG. 3 shows an example precoding process that supports DMRS precoding in high-Doppler scenarios.

FIG. 3 shows an example precoding process 300 that supports DMRS precoding in high-Doppler scenarios. The precoding process 300 may be implemented to realize aspects of the wireless communications system 100 or the signaling diagram 200. For example, a second device 210, which may be an example of a UE 115, one or more components of a BS 105, a TRP, a small cell, or any other device that is capable of transmitting a signal 215 including a set of DMRS symbols 220 and a set of information symbols 225, may perform the precoding process 300 to generate a time-domain signal 315 including an OTFS precoded first waveform portion carrying the DMRS symbols 220 and a non-OTFS precoded second waveform portion carrying the information symbols 225.

As part of the precoding process 300, the second device 210 may place DMRS symbols 220 of dimension $\tilde{M} \times \tilde{N}$ in a set of DMRS resources 305 in the delay-Doppler domain. The second device 210 may perform or apply an $\tilde{M} \times \tilde{N}$ ISFFT to the DMRS symbols 220 in the delay-Doppler domain (which may be equivalently understood as performing an OTFS precoding on the DMRS symbols 220) to obtain the DMRS symbols 220 in the time-frequency domain, such as within a time-frequency resource allocation 310. The time-frequency resource allocation 310 may be of size M× N, which may be associated with a quantity of M subcarriers in the frequency-domain and a quantity of N OFDM symbols in the time-domain. In some aspects, values of M and N may be smaller than M and N, respectively.

The second device 210, in association with or as a result of performing or applying the $\tilde{M} \times \tilde{N}$ ISFFT to the DMRS symbols 220 in the delay-Doppler domain, may uniformly allocate the DMRS symbols 220 throughout the time-frequency resource allocation 310 (such as in the entire time-frequency resource allocation 310). As such, the second device 210 may uniformly allocate the DMRS symbols 220 to the time-frequency resource allocation 310 such that the DMRS symbols 220 are uniformly spaced or distributed in the time-domain and uniformly spaced or distributed in the frequency-domain (such that the DMRS symbols 220 may be associated with a comb pattern). In some aspects, uniformly spaced DMRS symbols 220 in time may enable a receiving device, such as the first device 205, to estimate the Doppler of the channel, which the first device 205 may use for estimating ICI in high Doppler scenarios. Further, although the precoding process 300 illustrates an example resource allocation for the DMRS symbols 220 with a spacing of three subcarriers in the frequency-domain and continuous (such as consecutive) in the time-domain, the second device 210 may implement other example resource allocations for the DMRS symbols 220 such that the DMRS symbols 220 are uniformly spaced or distributed in both the time-domain and the frequency-domain.

The second device 210 may allocate or place information symbols 225, such as data symbols or other symbols conveying data or control information and which may be equivalently referred to as OFDM information symbols 225, in a remainder of the resources within the time-frequency resource allocation 310. In some implementations, the second device 210 may perform or apply an IFFT on the time-frequency resource allocation 310 to obtain the time-domain signal 315. The time-domain signal 315 may be an example of or understood as a multiplexed time-domain signal 315 that the second device 210 may transmit via over-the-air signaling and may include or otherwise convey an OTFS precoded first waveform portion carrying the DMRS symbols 220 and a non-OTFS precoded second waveform portion carrying the information symbols 225. As described herein, a non-OTFS precoded second waveform portion may refer to a waveform portion on which the second device 210 refrains from applying OTFS precoding (such that OFDM is exclusively used), while a OTFS precoded first waveform portion may refer to a waveform portion on which the second device applies OTFS precoding in addition to OFDM.

Figure 4:
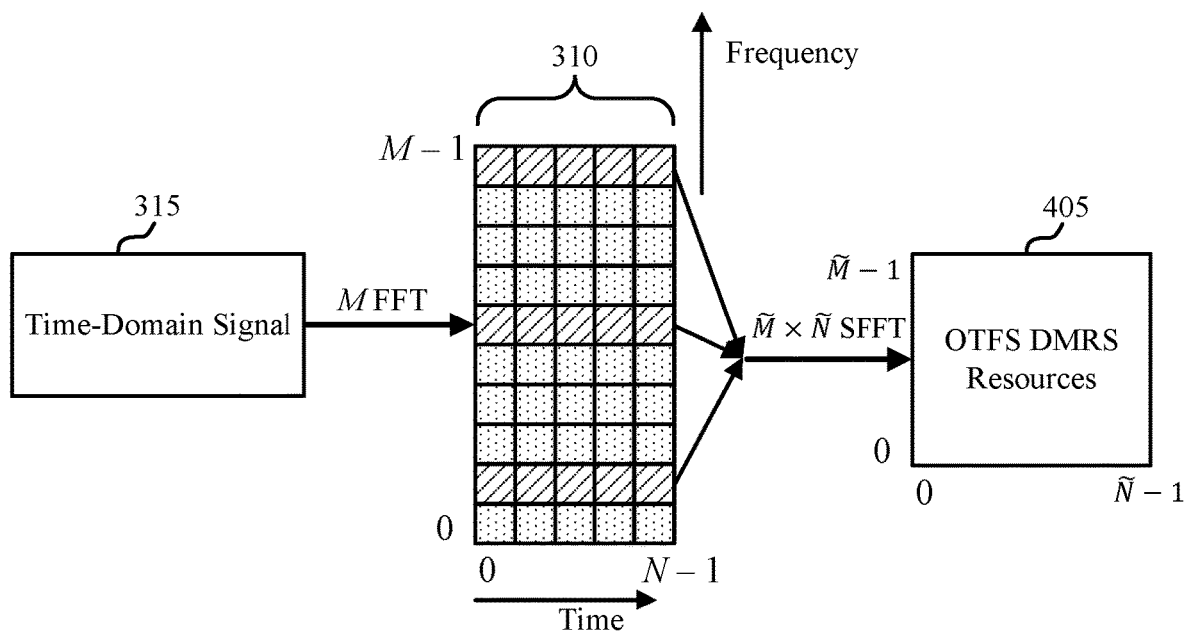
FIG. 4 shows an example decoding process that supports DMRS precoding in high-Doppler scenarios.

FIG. 4 shows an example decoding process 400 that supports DMRS precoding in high-Doppler scenarios. The decoding process 400 may be implemented to realize aspects of the wireless communications system 100 or the signaling diagram 200. For example, a first device 205, which may be an example of a UE 115, one or more components of a BS 105, a TRP, a small cell, or any other device that is capable of receiving a signal 215 including a set of DMRS symbols 220 and a set of information symbols 225, may perform the decoding process 400 to obtain a set of OTFS DMRS resources 405 from a time-domain signal 315 including an OTFS precoded first waveform portion carrying the DMRS symbols 220 and a non-OTFS precoded second waveform portion carrying the information symbols 225.

For example, the first device 205 may receive the time-domain signal 315 and may perform or apply an FFT on the received time-domain signal 315 to obtain the DMRS symbols 220 and the information symbols 225 in a time-frequency domain (such as within a time-frequency resource allocation 310). The time-frequency resource allocation 310 may be of size M× N, which may be associated with a quantity of M subcarriers in the frequency-domain and a quantity of N OFDM symbols in the time-domain.

In some implementations, the first device 205 may perform or apply an $\tilde{M} \times \tilde{N}$ SFFT on resources of the time-frequency resource allocation 310 that are allocated for the DMRS symbols 220 to obtain the DMRS symbols 220 in the delay-Doppler domain. For example, in association with or as a result of performing or applying the SFFT (which may be associated with an OTFS decoding or demodulating) on the resources of the time-frequency resource allocation 310 that are allocated for the DMRS symbols 220, the first device 205 may obtain the DMRS symbols 220 within a set of OTFS DMRS resources 405. In some aspects, the set of OTFS DMRS resources 405 may be of dimension $\tilde{M} \times \tilde{N}$.

The first device 205 may perform or apply a 2D circular correlator or a 2D circular correlation to obtain a delay-Doppler channel from the OTFS DMRS resources 405 and, in some implementations, may measure or estimate an ICI from the delay-Doppler channel. In some aspects, the first device 205 may measure or estimate the channel in accordance with or in association with receiving an entire slot. Additional details relating to OTFS coding, related processing, and channel descriptions or visualizations are illustrated by and described in more detail with reference to FIGS. 5 and 6.

Figure 5:
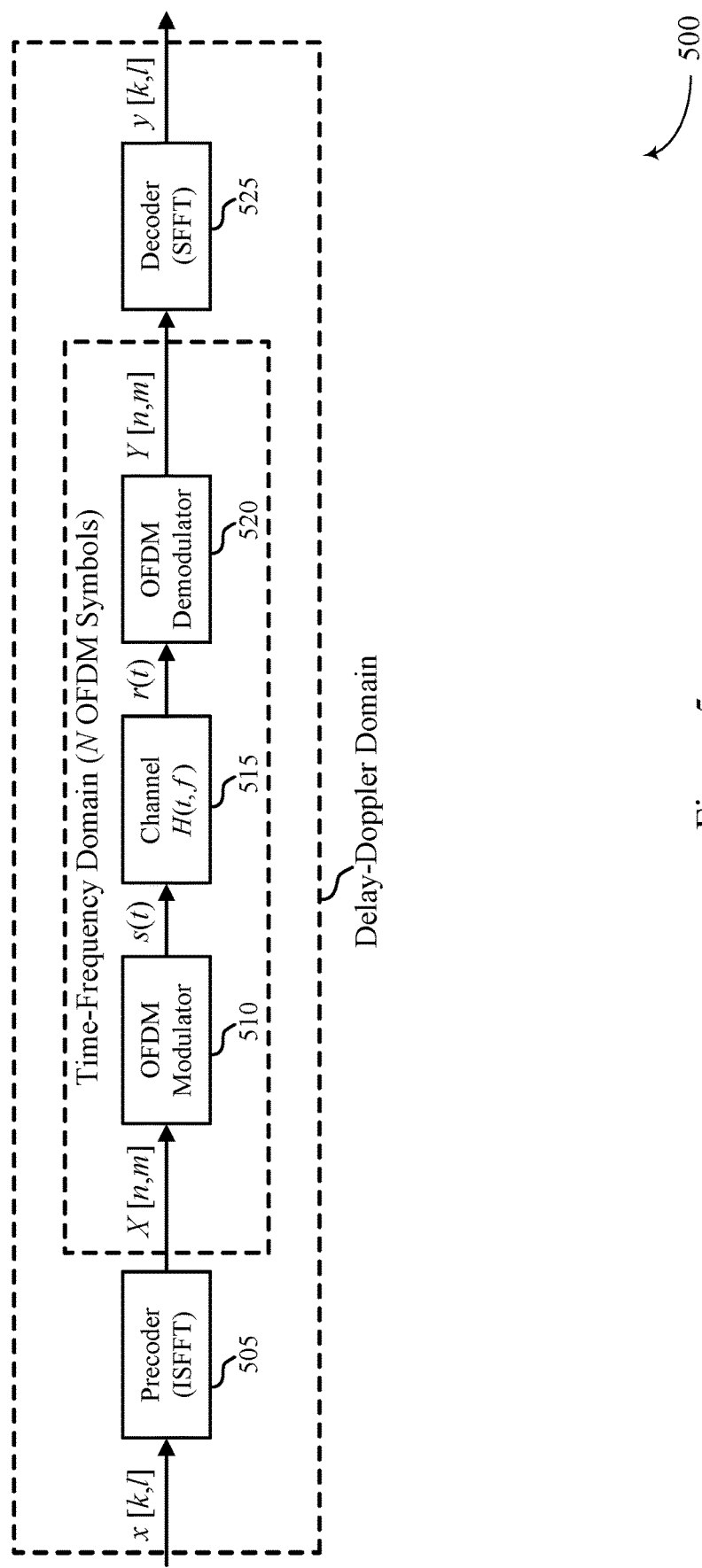
FIG. 5 shows an example coding scheme that supports DMRS precoding in high-Doppler scenarios.

FIG. 5 shows an example coding scheme 500 that supports DMRS precoding in high-Doppler scenarios. The coding scheme 500 may be implemented to realize aspects of the wireless communications system 100, the signaling diagram 200, the precoding process 300, or the decoding process 400. For example, a first device 205 and a second device 210 may perform one or more operations or processing tasks associated with the coding scheme 500 to transmit or receive a signal 215 including or otherwise conveying an OTFS precoded first waveform portion carrying DMRS symbols 220 and a non-OTFS precoded second waveform portion carrying information symbols 225.

In some aspects, OTFS modulation or precoding may be seen or understood as an ISFFT precoder 505 applied or performed on N consecutive OFDM symbols. For example, the second device 210 may include one or more components associated with the ISFFT precoder 505 and may perform or apply an ISFFT to a set of symbols x[k, l] (which may be examples of DMRS symbols 220). An ISFFT may be an example of a 2D FFT, where N is a quantity of OFDM symbols and M is a quantity of subcarriers. As part of the coding scheme 500, symbols (such as DMRS symbols 220 or information symbols 225) may be placed in the delay-Doppler domain instead of in the time-frequency domain (as may be performed for OFDM) and the second device 210 may transform the symbols from the delay-Doppler domain to the time-frequency domain via an ISFFT. Further, an ISFFT may be associated with an IFFT in the Doppler domain and an FFT in the delay domain, as illustrated by and described in more detail with reference to FIG. 6.

The second device 210 may obtain, as an output of the ISFFT precoder 505, a set of symbols X[n, m], which may be defined in accordance with Equation 1.

$$X[n, m] = \frac{1}{\sqrt{NM}} \sum_{k=0}^{N-1} \sum_{l=0}^{M-1} x[k, l] e^{j2\pi\left(\frac{nk}{N} - \frac{ml}{M}\right)} \quad (1)$$

The second device 210 may perform or apply an OFDM modulator 510 on the set of symbols X[n, m] to obtain a time-domain signal s(t) and may transmit the time-domain signal s(t) over-the-air to the first device 205. The over-the-air signaling between the second device 210 and the first device 205 may be associated with a time-frequency channel 515, which may be understood as H(t, f). The time-frequency channel 515 may be related to the delay-Doppler channel. For example, in some implementations, a relationship between the delay-Doppler channel h(t, v) and the time-frequency channel 515 H(t, f) may be defined in accordance with Equations 2 and 3.

$$h(\tau,v) = \iint H(t,f) e^{-j2\pi(vt-f\tau)} dt\, df \quad (2)$$

$$H(t,f) = \iint h(\tau,v) e^{j2\pi(vt-f\tau)} d\tau\, dv \quad (3)$$

In a discrete domain (such as in a domain associated with a quantity of discrete points or values), the relationship between the delay-Doppler channel h(τ, v)=h(l, k) and the time-frequency channel 515 H(t, f)=H(n, m) may be defined in accordance with Equations 4 and 5.

$$h[l, k] = \sum_{n=0}^{N-1} \sum_{m=0}^{M-1} H[n, m] e^{-j2\pi nk} e^{j2\pi ml} \quad (4)$$

$$H[n, m] = \sum_{k} \sum_{l} h[l, k] e^{j2\pi nk} e^{-j2\pi ml} \quad (5)$$

In some aspects, and due to or associated with an under-spread nature of the channel, h[l, k] may be non-zero for $$k < \frac{v_{max}}{\Delta f}, l < \frac{\tau_{max}}{T},$$

where Δf is a subcarrier spacing, T is an OFDM symbol duration, M is a quantity of subcarriers, N is a quantity of OFDM symbols, and $\tau_{max}$ and $v_{max}$ are a maximum delay spread and a maximum Doppler spread of the channel, respectively.

The first device 205 may receive a time-domain signal r(t) (such that r(t)=H(t,f)s(t)) and may perform or apply an OFDM demodulator 520 on the time domain signal r(t) to obtain a set of symbols Y[n, m] in the time-frequency domain. The first device 205 may perform or apply, via one or more components associated with an SFFT precoder 525, an SFFT on the set of symbols Y[n, m] in the time-frequency domain to obtain a set of symbols y[k, l] in the delay-Doppler domain. The first device 205 may perform or apply a circular correlation or convolution to obtain the delay-Doppler channel and an OTFS input-output relation in scenarios of delay-Doppler channel may be associated with a circular convolution (such as a 2D circular convolution) with varying phase shifts and defined in accordance with Equation 6.

$$y[k, l] = \sum_{i=0}^{p} h_i e^{j2\pi\left(\frac{l-l_{\tau_i}}{M}\right)\frac{k v_i}{N}} \alpha_i(k, l) \times \left[\left[k - k_{v_i}\right]_N, \left[l - l_{\tau_i}\right]_M\right] \quad (6)$$

In some aspects, and due in part to the under-spread nature, the channel may occupy a relatively small fraction or portion (such as a relatively small fraction or portion around an origin) of a delay-Doppler grid. As shown in Equation 6, P may be a quantity of delay-Doppler paths, $l_\tau$ may be a delay tap, $k_v$ may be a Doppler tap, and $\alpha_i(k, l)$ may be defined in accordance with Equation 7.

$$\alpha_i(k, l) = \begin{cases} 1 & l_{\tau_i} \leq l \leq M \\ e^{-j2\pi\left(\frac{[k-k_{v_i}]_N}{N}\right)} & 0 \leq l \leq l_{\tau_i} \end{cases} \quad (7)$$

In some implementations, a relation between the DMRS symbols 220 transmitted by the second device 210 and received by the first device 205 in the delay-Doppler domain may be approximated in accordance with Equation 8.

$$\tilde{y}[l', k'] \approx \sum_{k} \sum_{l} h[l, k] \tilde{x}\left[\mathrm{mod}(l' - l, \tilde{M}), \mathrm{mod}(k' - k, \tilde{N})\right] \quad (8)$$

As shown in Equation 8, x̃[l', k'] and ỹ[l', k'] may be the transmitted and received sequences corresponding to the DMRS symbols 220, respectively, in the delay-Doppler domain and h [l, k] may be the delay-Doppler channel. In some implementations, the first device 205 may estimate or measure a value of the delay-Doppler channel h[l, k] in accordance with implementing a circular correlator (such as a 2D circular correlator). In some aspects, the first device 205 may selectively perform or apply the circular correlator in accordance with one or more properties or characteristics of the transmitted or received DMRS symbols 220. For example, the first device 205 may perform or apply the circular correlator if the sequence x̃[l', k'] has suitable correlation properties (such as a correlation value that satisfies a threshold correlation value) or may refrain from performing or applying the circular correlator if the sequence x̃[l', k'] has unsuitable correlation properties (such as a correlation value that fails to satisfy a threshold correlation value).

In implementations in which the first device 205 estimates a value of h[l, k], the first device 205 may calculate, compute, or otherwise determine ICI in OFDM as the off-diagonal elements of $F\tilde{H}F^H$, where $\tilde{H}$ may be defined in accordance with Equation 9 and where F may be an FFT matrix. In accordance with Equation 9, for a zero Doppler scenario, $\tilde{H}$ may become a circular matrix with a first column as a channel impulse response.

$$\tilde{H}[p,q] = \sum_k \sum_l h[l,k]\delta(\text{mod}(p-q-l,M))e^{j2\pi qk} \quad (9)$$

As such, the first device 205 may measure or estimate a value of the delay-Doppler channel h[l, k] and may use the measured or estimated channel h[l, k] to measure or estimate an ICI associated with the channel. Further, and as a result of implementing the examples disclosed herein, the first device 205 may be able to more accurately measure or estimate the ICI associated with the channel in scenarios in which the first device 205 is in a high mobility state (such as moving relatively quickly) or otherwise in a high Doppler scenario. The first device 205 may use the measured or estimated ICI to receive the set of information symbols 225 also included in the time-domain signal. The first device 205 may experience a relatively higher likelihood for successfully receiving and decoding the information symbols 225 using an accurate ICI measurement or estimation, which may support greater spectral efficiency and higher data rates between the first device 205 and the second device 210.

Figure 6:
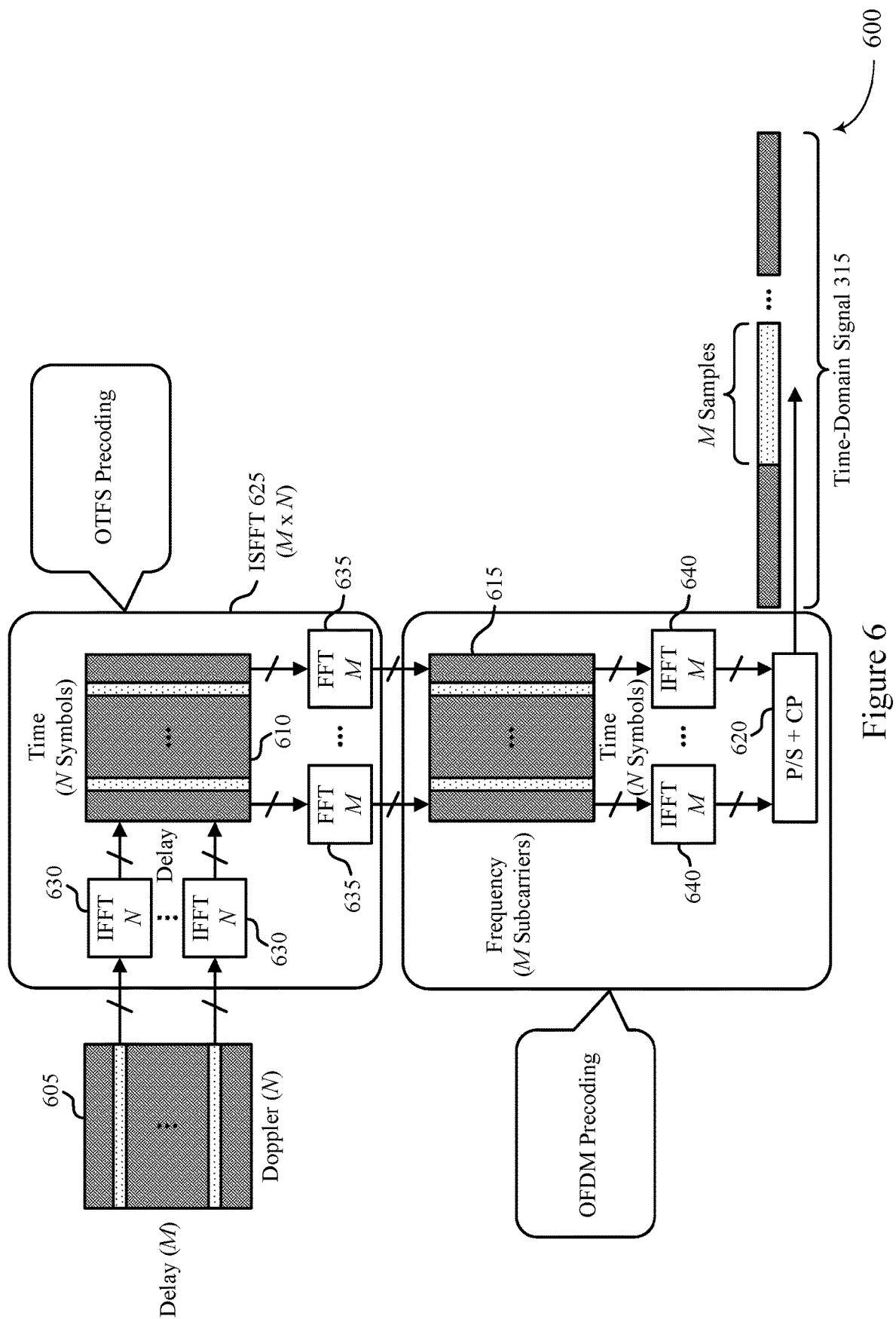
FIG. 6 shows an example processing diagram that supports DMRS precoding in high-Doppler scenarios.

FIG. 6 shows an example processing diagram 600 that supports DMRS precoding in high-Doppler scenarios. The processing diagram 600 may be implemented to realize aspects of the wireless communications system 100, the signaling diagram 200, the precoding process 300, the decoding process 400, or the coding scheme 500. For example, a second device 210 may perform one or more operations of the processing diagram 600 to support an OTFS transmitter implementation according to which the second device 210 may covert delay-Doppler domain symbols (such as DMRS symbols 220 or information symbols 225) to a time-frequency-domain using an ISFFT 625 and generate a time-domain signal 315 using an IFFT 640.

For example, the second device 210 may allocate or place DMRS symbols 220 or information symbols 225, or a combination thereof, in a delay-Doppler domain associated with, in the example of FIG. 6, a delay-domain size of M and a Doppler-domain size of N. Accordingly, a set of delay-Doppler domain resources 605 may have dimensions of M× N. For some modulation techniques, such as a quadrature-amplitude modulation (QAM) or a quotient QAM (Q-QAM), the delay-Doppler domain resources 605 may convey $MN*\log_2(Q)$ bits.

To generate an OTFS waveform (such as an OTFS precoded waveform), the second device 210 may perform or apply an ISFFT 625 of size M×N to convert the delay-Doppler domain resources 605 (including DMRS symbols 220 or information symbols 225) to a set of time-frequency domain resources 615. To perform the ISFFT 625, which may be associated with or equivalently referred to as an OTFS precoding, the second device 210 may perform or apply an IFFT 630 of size N on the delay-Doppler domain resources 605 to obtain a set of delay-time domain resources 610 and may perform or apply an FFT 635 of size M on the delay-time domain resources 610 to obtain the time-frequency domain resources 615.

The second device 210 may perform or apply an IFFT 640 of size M on the set of time-frequency domain resources 615 to obtain a phase shift (P/S) and cyclic prefix (CP) 620 associated with a time-domain signal 315. In some aspects, the performance of the IFFT 640 on the set of time-frequency domain resources 615 may involve one or more processing steps that are associated with (such as identical to) processing associated with an OFDM waveform or OFDM precoding. The second device 210 may output the P/S and CP 620 to the time-domain signal 315. In some aspects, the time-domain signal 315 may include a quantity of N symbols and each of the N symbols may include or convey M samples.

Accordingly, in some implementations, the second device 210 may perform a first set of one or more operations (such as operations associated with both the OTFS precoding and the OFDM precoding) of the processing diagram 600 for a set of DMRS symbols 220 and may perform a second set of one or more operations (such as operations associated with the OFDM precoding) of the processing diagram 600 for a set of information symbols 225. As such, the second device 210 may generate and output a time-domain signal 315 including an OTFS precoded first waveform portion carrying the DMRS symbols 220 and a non-OTFS precoded second waveform portion (such as an OFDM precoded OFDM waveform portion) carrying the information symbols 225. A first device 205 may receive the time-domain signal 315 and, in some implementations, may perform one or more operations associated with reversing the processing diagram 600 (such as to obtain the information symbols 225 in the time-frequency domain and to obtain the DMRS symbols 220 in the delay-Doppler domain).

Further, although described herein as including two distinct waveform portions, a time-domain signal 315 conveying OTFS precoded DMRS symbols 220 and information symbols 225 that are not OTFS-precoded may, in some aspects, include a single time-domain waveform. In such aspects, an OTFS precoded first waveform portion and a non-OTFS precoded second waveform portion may be waveforms that appear or exist during encoding and decoding processes (and may not appear in the over-the-air signaling) and, as such, the time-domain signal 315 may be understood as including two distinct waveform portions as a result of such waveform portions appearing or existing during the encoding and decoding processes.

Figure 7:
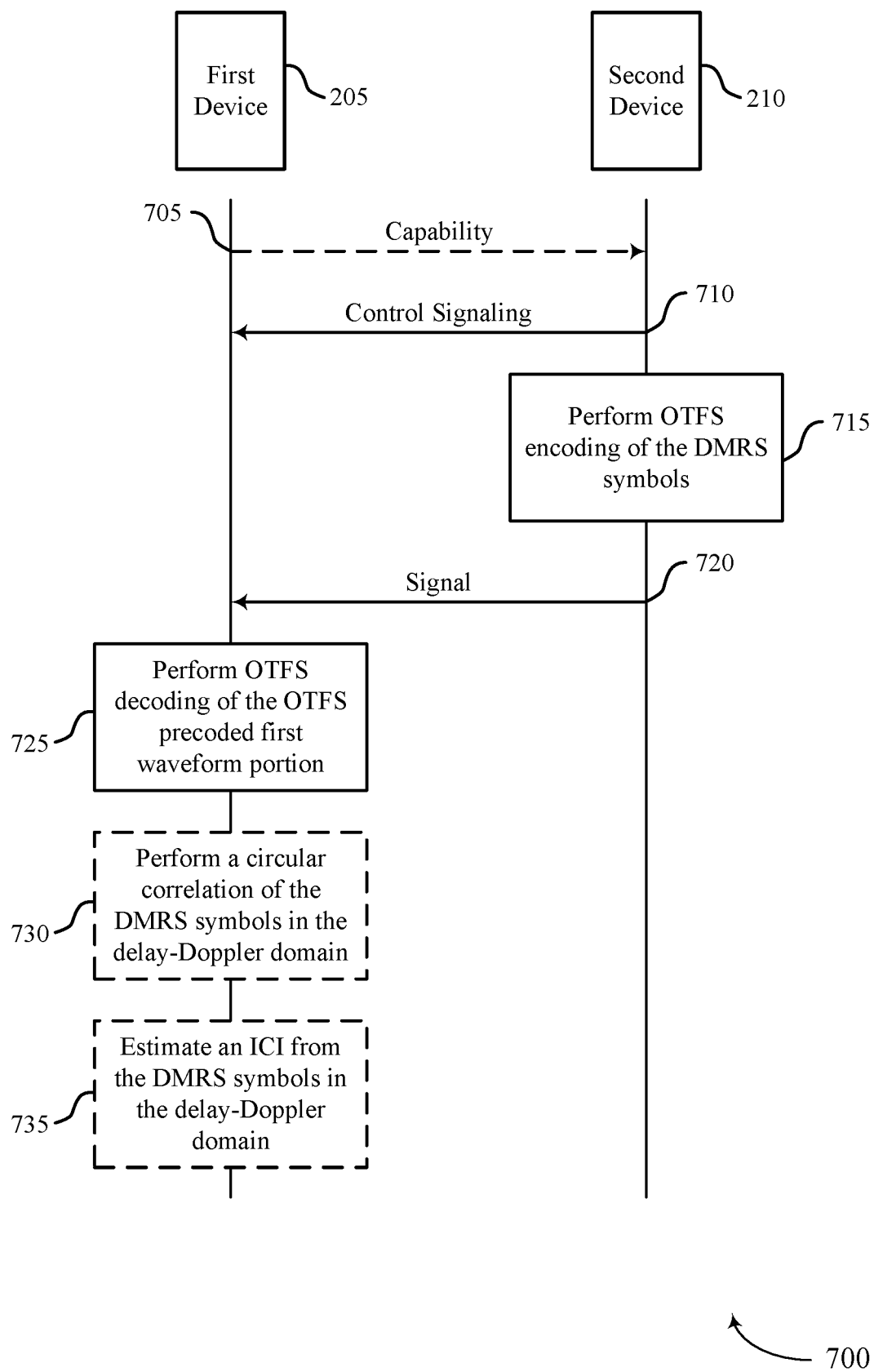
FIG. 7 shows an example process flow that supports DMRS precoding in high-Doppler scenarios.

FIG. 7 shows an example process flow 700 that supports DMRS precoding in high-Doppler scenarios. The process flow 700 may implement or be implemented to realize aspects of the wireless communications system 100, the signaling diagram 200, the precoding process 300, the decoding process 400, the coding scheme 500, or the processing diagram 600. For example, the process flow 700 illustrates communication between a first device 205 and a second device 210. The first device 205 may be an example of a UE 115, one or more components of a BS 105, a TRP, a small cell, or any other device that is capable of receiving a signal 215 including a set of DMRS symbols 220 and a set of information symbols 225. The second device 210 may be an example of a UE 115, one or more components of a BS 105, a TRP, a small cell, or any other device that is capable of transmitting the signal 215 including the set of DMRS symbols 220 and the set of information symbols 225.

In the following description of the process flow 700, the operations may be performed (such as reported or provided) in a different order than the order shown, or the operations performed by the example devices may be performed in different orders or at different times. Some operations also may be omitted from the process flow 700, or other operations may be added to the process flow 700. Further, although some operations or signaling may be shown to occur at different times for discussion purposes, these operations may actually occur at the same time or otherwise concurrently.

At 705, the first device 205 may, in some implementations, transmit, to the second device 210, an indication of a capability of the first device 205 to support an OTFS precoding for a set of DMRS symbols (such as a set of DMRS symbols 220).

At 710, the first device 205 may receive, from the second device 210, control signaling indicating a use of OTFS precoding for the set of DMRS symbols. In some implementations, the second device 210 may transmit the control signaling indicating the use of OTFS precoding for the set of DMRS symbols in associated with or responsive to receiving the indication from the first device 205 of the capability of the first device 205 to support OTFS precoding for the set of DMRS symbols. In some implementations, the control signaling may indicate additional information associated with an OTFS precoded DMRS, such as an indication of a time dimension and a frequency dimension or a delay dimension and a Doppler dimension associated with the DMRS resources. In some aspects, the DMRS resources may define the OTFS precoded first waveform portion in a time-frequency domain. For example, the DMRS resources may be associated with a comb structure of uniformly spaced subcarriers in the frequency-domain and uniformly spaced symbols in the time-domain, such that the time dimension and the frequency dimension correspond to such a comb structure.

At 715, the second device 210 may perform OTFS encoding of the set of DMRS symbols via an ISFFT. In some implementations, the OTFS encoding (which may be equivalently referred to herein as OTFS precoding) of the DMRS symbols may transform the DMRS symbols from a delay-Doppler domain to a time-frequency domain to obtain an OTFS precoded first waveform portion. In some aspects, the second device 210 may additionally allocate a remainder of resources in the time-frequency domain to information symbols (such as information symbols 225, which may include data symbols or control symbols) and may perform an IFFT on the time-frequency domain symbols to generate a time-domain waveform. In some implementations, the second device 210) may generate a second waveform portion including the information symbols allocated to the remainder of the resources in the time-frequency domain (such that the second device refrains from applying OTFS precoding to the information symbols). In some aspects, the DMRS symbols may correspond to one or more of a ZC sequence or a PN sequence in at least one dimension of the delay-Doppler domain. Additional details relating to the OTFS encoding of the DMRS symbols are illustrated by and described with reference to FIGS. 3, 5, and 6.

At 720, the second device 210 may transmit, and the first device 205 may receive, a signal including the OTFS precoded first waveform portion carrying the DMRS symbols interleaved with the non-OTFS precoded second waveform portion carrying the information symbols. In some aspects, the second device 210) may transmit the signal in association with the control signaling sent at 710. For example, the control signaling transmitted at 710 may indicate that the signal transmitted at 720 is to include both the OTFS precoded first waveform portion for the DMRS symbols and the non-OTFS precoded second waveform portion for the information symbols.

At 725, the first device 205 may perform OTFS decoding of the OTFS precoded first waveform portion via an SFFT. In some implementations, the OTFS decoding of the OTFS precoded first waveform portion may transform the DMRS symbols from the time-frequency domain to the delay-Doppler domain. In some aspects, the first device 205 may additionally (and prior to performing the OTFS decoding) apply an FFT to the received time-domain signal to transform the time-domain signal to the time-frequency domain. Additional details relating to the OTFS decoding of the DMRS symbols are illustrated by and described with reference to FIGS. 4 and 5.

At 730, the first device 205 may, in some implementations, perform a circular correlation (such as a 2D circular correlator) of the DMRS symbols in the delay-Doppler domain to produce or otherwise obtain a delay-Doppler channel estimate.

At 735, the first device 205 may, in some implementations, estimate an ICI from the DMRS symbols in the delay-Doppler domain. In some aspects the first device 250 may estimate or measure the ICI in accordance with the delay-Doppler channel estimate as described in more detail herein, including with reference to FIG. 5. In some implementations, the first device 205 may receive the information symbols of the signal transmitted at 720 in accordance with estimating the delay-Doppler channel and using the delay-Doppler channel estimate to estimate or measure an ICI.

Figure 8:
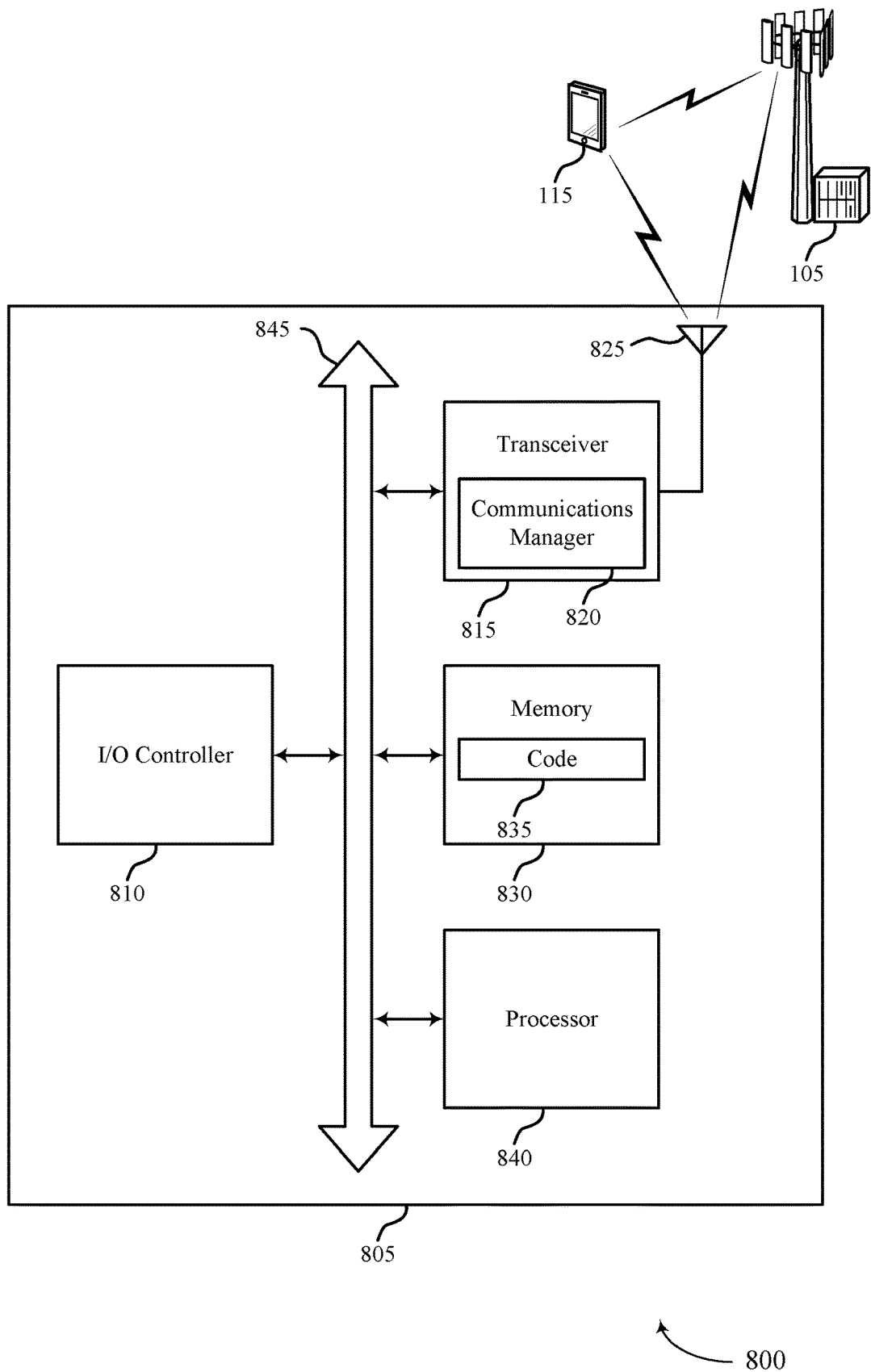
FIGS. 8 and 9 show block diagrams of example devices that support DMRS precoding in high-Doppler scenarios.

FIG. 8 shows a block diagram 800 of an example device 805 that supports DMRS precoding in high-Doppler scenarios. The device 805 may be an example of a UE 115 and may communicate wirelessly with one or more BSs 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (such as operatively, communicatively, functionally, electronically, electrically) via one or more buses (such as a bus 845).

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some implementations, the I/O controller 810 may be implemented as part of a processor or processing system, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825.

In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations in accordance with received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (such as the processor 840, or the memory 830, or both), may be included in a chip or chip assembly that is installed in the device 805.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (such as when compiled and executed) to perform functions described herein. In some implementations, the memory 830 may contain, among other things, a basic I/O system (BIOS) which may control basic hardware or software operation such as the interaction with peripheral components or devices.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805.

The processing system of the device 805 may interface with other components of the device 805, and may process information received from other components (such as inputs or signals) or output information to other components. For example, a chip or modem of the device 805 may include a processing system and an interface to output information or to obtain information. The interface may be implemented as or otherwise include a first interface configured to output information and a second interface configured to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The communications manager 820 may support wireless communication at a first device in accordance with examples as disclosed herein. For example, the communications manager 820 may be configured as or otherwise support a means for receiving, from a second device, control signaling indicating a use of OTFS precoding for a set of multiple DMRS symbols. The communications manager 820 may be configured as or otherwise support a means for receiving, from the second device and associated with the control signaling, a signal including an OTFS precoded first waveform portion carrying the set of multiple DMRS symbols interleaved with a non-OTFS precoded second waveform portion carrying a set of multiple information symbols.

In some implementations, to support receiving the control signaling, the communications manager 820 may be configured as or otherwise support a means for receiving an indication of a time dimension and a frequency dimension associated with DMRS resources, where the DMRS resources define the OTFS precoded first waveform portion in a time-frequency domain.

In some implementations, the time dimension and the frequency dimension correspond to a comb structure of uniformly spaced subcarriers in a frequency-domain and uniformly spaced symbols in a time-domain within the signal.

In some implementations, the communications manager 820 may be configured as or otherwise support a means for performing OTFS decoding of the OTFS precoded first waveform portion via an SFFT, where the OTFS decoding of the OTFS precoded first waveform portion transforms the set of multiple DMRS symbols from the time-frequency domain to a delay-Doppler domain.

In some implementations, the communications manager 820 may be configured as or otherwise support a means for receiving the set of multiple information symbols from the second device in accordance with a delay-Doppler domain channel estimate associated with the set of multiple DMRS symbols in the delay-Doppler domain, where the set of multiple information symbols include one or both of data and control signals.

In some implementations, the communications manager 820 may be configured as or otherwise support a means for performing a circular correlation of the set of multiple DMRS symbols in the delay-Doppler domain, where the circular correlation produces the delay-Doppler domain channel estimate.

In some implementations, the communications manager 820 may be configured as or otherwise support a means for estimating an inter-carrier interference from the set of multiple DMRS symbols in the delay-Doppler domain, where one or both of the data and the control signals is received from the second device according to the inter-carrier interference.

In some implementations, the set of multiple DMRS symbols may correspond to a ZC sequence or a PN sequence in at least one dimension of the delay-Doppler domain.

In some implementations, the communications manager 820 may be configured as or otherwise support a means for transmitting, to the second device, an indication of a capability of the first device to support the OTFS precoding for the set of multiple DMRS symbols.

In some implementations, the communications manager 820 may be configured to perform various operations (such as receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of DMRS precoding in high-Doppler scenarios as described herein, or the processor 840 and the memory 830 may be otherwise configured to perform or support such operations.

Figure 9:
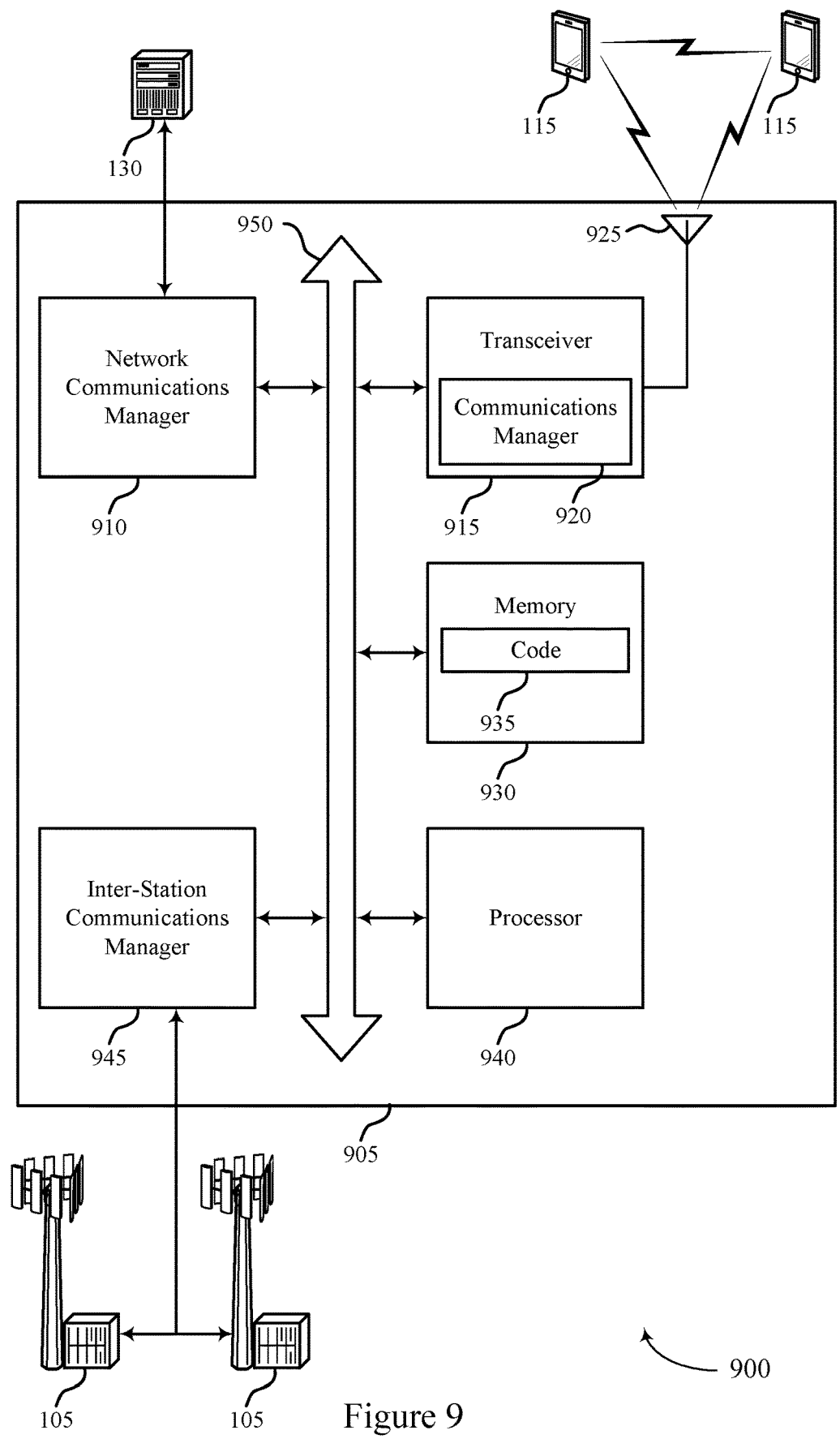

FIG. 9 shows a block diagram 900 of an example device 905 that supports DMRS precoding in high-Doppler scenarios. The device 905 may be an example of one or more components of a BS 105 and may communicate wirelessly with one or more BSs 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (such as operatively, communicatively, functionally, electronically, electrically) via one or more buses (such as a bus 950).

The network communications manager 910 may manage communications with a core network 130 (such as via one or more wired backhaul links). For example, the network communications manager 910 may manage the transfer of data communications for client devices, such as one or more UEs 115.

In some implementations, the device 905 may include a single antenna 925. However, in some other implementations, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

In some implementations, the transceiver 915 may include one or more interfaces, such as one or more interfaces coupled with the one or more antennas 925 that are configured to support various receiving or obtaining operations, or one or more interfaces coupled with the one or more antennas 925 that are configured to support various transmitting or outputting operations, or a combination thereof. In some implementations, the transceiver 915 may include or be configured for coupling with one or more processors or memory components that are operable to perform or support operations in accordance with received or obtained information or signals, or to generate information or other signals for transmission or other outputting, or any combination thereof. In some implementations, the transceiver 915, or the transceiver 915 and the one or more antennas 925, or the transceiver 915 and the one or more antennas 925 and one or more processors or memory components (such as the processor 940, or the memory 930, or both), may be included in a chip or chip assembly that is installed in the device 905.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some implementations, the code 935 may not be directly executable by the processor 940 but may cause a computer (such as when compiled and executed) to perform functions described herein. In some implementations, the memory 930 may contain, among other things, a BIOS which may control basic hardware or software operation such as the interaction with peripheral components or devices.

The processor 940 may be any one or more suitable processors capable of executing scripts or instructions of one or more software programs stored in the device 905 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 940, or the transceiver 915, or the communications manager 920, or other components or combinations of components of the device 905.

The processing system of the device 905 may interface with other components of the device 905, and may process information received from other components (such as inputs or signals) or output information to other components. For example, a chip or modem of the device 905 may include a processing system and an interface to output information or to obtain information. The interface may be implemented as or otherwise include a first interface configured to output information and a second interface configured to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs.

The inter-station communications manager 945 may manage communications with other BSs 105, and may include a controller or scheduler for controlling communications with UEs 115 in cooperation with other BSs 105. For example, the inter-station communications manager 945 may coordinate scheduling for transmissions to UEs 115 for various interference mitigation techniques such as beamforming or joint transmission. In some implementations, the inter-station communications manager 945 may provide an X2 interface within an LTE/LTE-A wireless communications network technology to provide communication between BSs 105.

The communications manager 920 may support wireless communication at a second device in accordance with examples as disclosed herein. For example, the communications manager 920 may be configured as or otherwise support a means for transmitting, to a first device, control signaling indicating a use of OTFS precoding for a set of multiple DMRS symbols. The communications manager 920 may be configured as or otherwise support a means for transmitting, to the first device and associated with the control signaling, a signal including an OTFS precoded first waveform portion carrying the set of multiple DMRS symbols interleaved with a non-OTFS precoded second waveform portion carrying a set of multiple information symbols.

In some implementations, to support transmitting the control signaling, the communications manager 920 may be configured as or otherwise support a means for transmitting an indication of a time dimension and a frequency dimension associated with DMRS resources, where the DMRS resources define the OTFS precoded first waveform portion in a time-frequency domain.

In some implementations, the time dimension and the frequency dimension correspond to a comb structure of uniformly spaced subcarriers in a frequency-domain and uniformly spaced symbols in a time-domain within the signal.

In some implementations, the communications manager 920 may be configured as or otherwise support a means for performing OTFS encoding of the set of multiple DMRS symbols via an ISFFT, where the OTFS encoding of the set of multiple DMRS symbols transforms the set of multiple DMRS symbols from a delay-Doppler domain to the time-frequency domain to obtain the OTFS precoded first waveform portion.

In some implementations, the set of multiple DMRS symbols may correspond to a ZC sequence or a PN sequence in at least one dimension of the delay-Doppler domain.

In some implementations, the communications manager 920 may be configured as or otherwise support a means for receiving, from the first device, an indication of a capability of the first device to support the OTFS precoding of the set of multiple DMRS symbols.

In some implementations, the set of multiple information symbols include one or both of data and control signals.

In some implementations, the communications manager 920 may be configured to perform various operations (such as receiving, monitoring, transmitting) using or otherwise in cooperation with the transceiver 915, the one or more antennas 925, or any combination thereof. Although the communications manager 920 is illustrated as a separate component, in some implementations, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of DMRS precoding in high-Doppler scenarios as described herein, or the processor 940 and the memory 930 may be otherwise configured to perform or support such operations.

Figure 10:
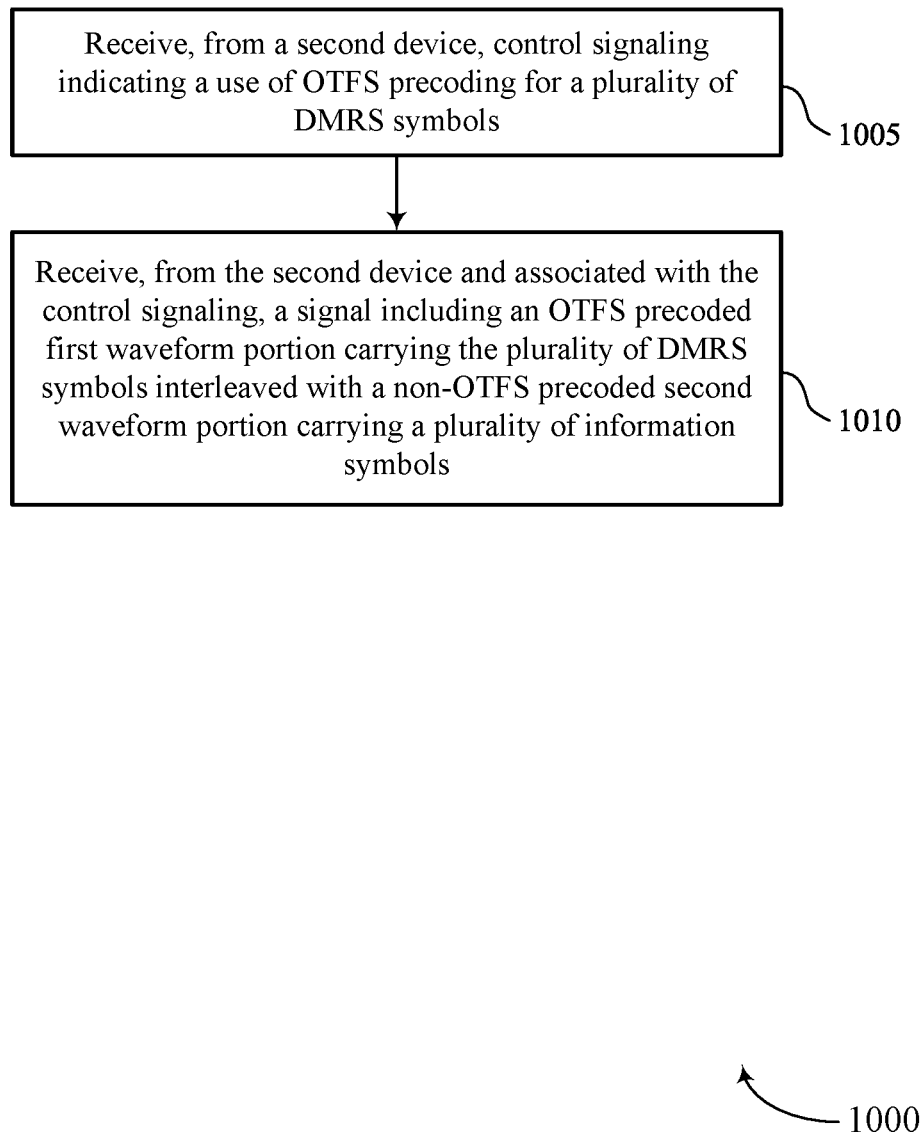
FIGS. 10 and 11 show flowcharts illustrating example methods that support DMRS precoding in high-Doppler scenarios.

FIG. 10 shows a flowchart illustrating an example method 1000 that supports DMRS precoding in high-Doppler scenarios. The operations of the method 1000 may be implemented by a UE or its components as described herein. For example, the operations of the method 1000 may be performed by a UE 115 as described with reference to FIGS. 1 through 8. In some implementations, a UE may execute a set of instructions to control the functional elements of the UE to perform the described functions. Additionally, or alternatively, the UE may perform aspects of the described functions using special-purpose hardware.

At 1005, the method may include receiving, from a second device, control signaling indicating a use of OTFS precoding for a set of multiple DMRS symbols. The operations of 1005 may be performed in accordance with examples as disclosed herein.

At 1010, the method may include receiving, from the second device and associated with the control signaling, a signal including an OTFS precoded first waveform portion carrying the set of multiple DMRS symbols interleaved with a non-OTFS precoded second waveform portion carrying a set of multiple information symbols. The operations of 1010 may be performed in accordance with examples as disclosed herein.

Figure 11:
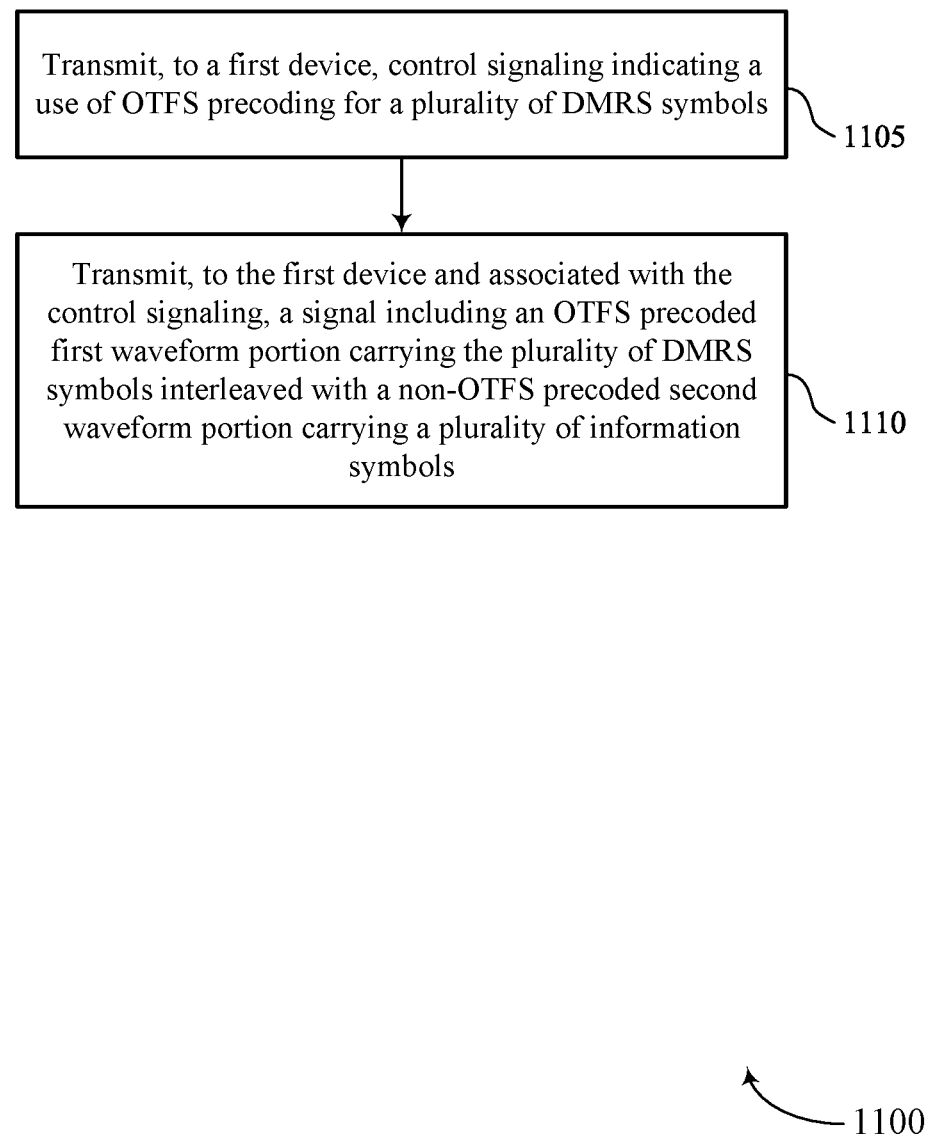

FIG. 11 shows a flowchart illustrating an example method 1100 that supports DMRS precoding in high-Doppler scenarios. The operations of the method 1100 may be implemented by a BS or its components as described herein. For example, the operations of the method 1100 may be performed by one or more components of a BS 105 as described with reference to FIGS. 1 through 7 and 9. In some implementations, one or more components of a BS may execute a set of instructions to control the functional elements of one or more components of the BS to perform the described functions. Additionally, or alternatively, one or more components of the BS may perform aspects of the described functions using special-purpose hardware.

At 1105, the method may include transmitting, to a first device, control signaling indicating a use of OTFS precoding for a set of multiple DMRS symbols. The operations of 1105 may be performed in accordance with examples as disclosed herein.

At 1110, the method may include transmitting, to the first device and associated with the control signaling, a signal including an OTFS precoded first waveform portion carrying the set of multiple DMRS symbols interleaved with a non-OTFS precoded second waveform portion carrying a set of multiple information symbols. The operations of 1110 may be performed in accordance with examples as disclosed herein.

The following provides an overview of some aspects of the present disclosure:

Aspect 1: A method for wireless communication at a first device, including: receiving, from a second device, control signaling indicating a use of OTFS precoding for a set of multiple DMRS symbols; and receiving, from the second device and associated with the control signaling, a signal including an OTFS precoded first waveform portion carrying the set of multiple DMRS symbols interleaved with a non-OTFS precoded second waveform portion carrying a set of multiple information symbols.

Aspect 2: The method of aspect 1, where receiving the control signaling includes: receiving an indication of a time dimension and a frequency dimension associated with DMRS resources, where the DMRS resources define the OTFS precoded first waveform portion in a time-frequency domain.

Aspect 3: The method of aspect 2, where the time dimension and the frequency dimension correspond to a comb structure of uniformly spaced subcarriers in a frequency-domain and uniformly spaced symbols in a time-domain within the signal.

Aspect 4: The method of any of aspects 2 or 3, further including: performing OTFS decoding of the OTFS precoded first waveform portion via a SFFT, where the OTFS decoding of the OTFS precoded first waveform portion transforms the set of multiple DMRS symbols from the time-frequency domain to a delay-Doppler domain.

Aspect 5: The method of aspect 4, further including: receiving the set of multiple information symbols from the second device in accordance with a delay-Doppler domain channel estimate associated with the set of multiple DMRS symbols in the delay-Doppler domain, where the set of multiple information symbols include one or both of data and control signals.

Aspect 6: The method of aspect 5, further including: performing a circular correlation of the set of multiple DMRS symbols in the delay-Doppler domain, where the circular correlation produces the delay-Doppler domain channel estimate.

Aspect 7: The method of any of aspects 5 or 6, further including: estimating an ICI from the set of multiple DMRS symbols in the delay-Doppler domain, where one or both of the data and the control signals is received from the second device according to the ICI.

Aspect 8: The method of any of aspects 4-7, where the set of multiple DMRS symbols correspond to one or more of a ZC sequence or a PN sequence in at least one dimension of the delay-Doppler domain.

Aspect 9: The method of any of aspects 1-8, further including: transmitting, to the second device, an indication of a capability of the first device to support the OTFS precoding for the set of multiple DMRS symbols.

Aspect 10: A method for wireless communication at a second device, including: transmitting, to a first device, control signaling indicating a use of OTFS precoding for a set of multiple DMRS symbols; and transmitting, to the first device and associated with the control signaling, a signal including an OTFS precoded first waveform portion carrying the set of multiple DMRS symbols interleaved with a non-OTFS precoded second waveform portion carrying a set of multiple information symbols.

Aspect 11: The method of aspect 10, where transmitting the control signaling includes: transmitting an indication of a time dimension and a frequency dimension associated with DMRS resources, where the DMRS resources define the OTFS precoded first waveform portion in a time-frequency domain.

Aspect 12: The method of aspect 11, where the time dimension and the frequency dimension correspond to a comb structure of uniformly spaced subcarriers in a frequency-domain and uniformly spaced symbols in a time-domain within the signal.

Aspect 13: The method of any of aspects 11 or 12, further including: performing OTFS encoding of the set of multiple DMRS symbols via an ISFFT, where the OTFS encoding of the set of multiple DMRS symbols transforms the set of multiple DMRS symbols from a delay-Doppler domain to the time-frequency domain to obtain the OTFS precoded first waveform portion.

Aspect 14: The method of aspect 13, where the set of multiple DMRS symbols correspond to one or more of a ZC sequence or a PN sequence in at least one dimension of the delay-Doppler domain.

Aspect 15: The method of any of aspects 10-14, further including: receiving, from the first device, an indication of a capability of the first device to support the OTFS precoding of the set of multiple DMRS symbols.

Aspect 16: The method of any of aspects 10-15, where the set of multiple information symbols include one or both of data and control signals.

Aspect 17: An apparatus for wireless communication at a first device, including: a processor: memory coupled with the processor; and instructions stored in the memory and executable by the processor to cause the apparatus to: receive, from a second device, control signaling indicating a use of OTFS precoding for a set of multiple DMRS symbols; and receive, from the second device and associated with the control signaling, a signal including an OTFS precoded first waveform portion carrying the set of multiple DMRS symbols interleaved with a non-OTFS precoded second waveform portion carrying a set of multiple information symbols.

Aspect 18: The apparatus of aspect 17, where the instructions to receive the control signaling are executable by the processor to cause the apparatus to: receive an indication of a time dimension and a frequency dimension associated with DMRS resources, where the DMRS resources define the OTFS precoded first waveform portion in a time-frequency domain.

Aspect 19: The apparatus of aspect 18, where the time dimension and the frequency dimension correspond to a comb structure of uniformly spaced subcarriers in a frequency-domain and uniformly spaced symbols in a time-domain within the signal.

Aspect 20: The apparatus of any of aspects 18 or 19, where the instructions are further executable by the processor to cause the apparatus to: perform OTFS decoding of the OTFS precoded first waveform portion via a SFFT, where the OTFS decoding of the OTFS precoded first waveform portion transforms the set of multiple DMRS symbols from the time-frequency domain to a delay-Doppler domain.

Aspect 21: The apparatus of aspect 20, where the instructions are further executable by the processor to cause the apparatus to: receive the set of multiple information symbols from the second device in accordance with a delay-Doppler domain channel estimate associated with the set of multiple DMRS symbols in the delay-Doppler domain, where the set of multiple information symbols include one or both of data and control signals.

Aspect 22: The apparatus of aspect 21, where the instructions are further executable by the processor to cause the apparatus to: perform a circular correlation of the set of multiple DMRS symbols in the delay-Doppler domain, where the circular correlation produces the delay-Doppler domain channel estimate.

Aspect 23: The apparatus of any of aspects 21 or 22, where the instructions are further executable by the processor to cause the apparatus to: estimate an ICI from the set of multiple DMRS symbols in the delay-Doppler domain, where one or both of the data and the control signals is received from the second device according to the ICI.

Aspect 24: The apparatus of any of aspects 20-23, where: a ZC sequence or a PN sequence in at least one dimension of the delay-Doppler domain.

Aspect 25: The apparatus of any of aspects 17-24, where the instructions are further executable by the processor to cause the apparatus to: transmit, to the second device, an indication of a capability of the first device to support the OTFS precoding for the set of multiple DMRS symbols.

Aspect 26: An apparatus for wireless communication at a second device, including: a processor: memory coupled with the processor; and instructions stored in the memory and executable by the processor to cause the apparatus to: transmit, to a first device, control signaling indicating a use of OTFS precoding for a set of multiple DMRS symbols; and transmit, to the first device and associated with the control signaling, a signal including an OTFS precoded first waveform portion carrying the set of multiple DMRS symbols interleaved with a non-OTFS precoded second waveform portion carrying a set of multiple information symbols.

Aspect 27: The apparatus of aspect 26, where the instructions to transmit the control signaling are executable by the processor to cause the apparatus to: transmit an indication of a time dimension and a frequency dimension associated with DMRS resources, where the DMRS resources define the OTFS precoded first waveform portion in a time-frequency domain.

Aspect 28: The apparatus of aspect 27, where the time dimension and the frequency dimension correspond to a comb structure of uniformly spaced subcarriers in a frequency-domain and uniformly spaced symbols in a time-domain within the signal.

Aspect 29: The apparatus of any of aspects 27 or 28, where the instructions are further executable by the processor to cause the apparatus to: perform OTFS encoding of the set of multiple DMRS symbols via an ISFFT, where the OTFS encoding of the set of multiple DMRS symbols transforms the set of multiple DMRS symbols from a delay-Doppler domain to the time-frequency domain to obtain the OTFS precoded first waveform portion.

Aspect 30: The apparatus of aspect 29, where: a ZC sequence or a PN sequence in at least one dimension of the delay-Doppler domain.

Aspect 31: The apparatus of any of aspects 26-30, where the instructions are further executable by the processor to cause the apparatus to: receive, from the first device, an indication of a capability of the first device to support the OTFS precoding of the set of multiple DMRS symbols.

Aspect 32: The apparatus of any of aspects 26-31, where the set of multiple information symbols include one or both of data and control signals.

Aspect 33: An apparatus for wireless communication at a first device, including: means for receiving, from a second device, control signaling indicating a use of OTFS precoding for a set of multiple DMRS symbols; and means for receiving, from the second device and associated with the control signaling, a signal including an OTFS precoded first waveform portion carrying the set of multiple DMRS symbols interleaved with a non-OTFS precoded second waveform portion carrying a set of multiple information symbols.

Aspect 34: The apparatus of aspect 33, where the means for receiving the control signaling include: means for receiving an indication of a time dimension and a frequency dimension associated with DMRS resources, where the DMRS resources define the OTFS precoded first waveform portion in a time-frequency domain.

Aspect 35: The apparatus of aspect 34, where the time dimension and the frequency dimension correspond to a comb structure of uniformly spaced subcarriers in a frequency-domain and uniformly spaced symbols in a time-domain within the signal.

Aspect 36: The apparatus of any of aspects 34 or 35, further including: means for performing OTFS decoding of the OTFS precoded first waveform portion via a SFFT, where the OTFS decoding of the OTFS precoded first waveform portion transforms the set of multiple DMRS symbols from the time-frequency domain to a delay-Doppler domain.

Aspect 37: The apparatus of aspect 36, further including: means for receiving the set of multiple information symbols from the second device in accordance with a delay-Doppler domain channel estimate associated with the set of multiple DMRS symbols in the delay-Doppler domain, where the set of multiple information symbols include one or both of data and control signals.

Aspect 38: The apparatus of aspect 37, further including: means for performing a circular correlation of the set of multiple DMRS symbols in the delay-Doppler domain, where the circular correlation produces the delay-Doppler domain channel estimate.

Aspect 39: The apparatus of any of aspects 37 or 38, further including: means for estimating an ICI from the set of multiple DMRS symbols in the delay-Doppler domain, where one or both of the data and the control signals is received from the second device according to the ICI.

Aspect 40: The apparatus of any of aspects 36-39, where: a ZC sequence or a PN sequence in at least one dimension of the delay-Doppler domain.

Aspect 41: The apparatus of any of aspects 33-40, further including: means for transmitting, to the second device, an indication of a capability of the first device to support the OTFS precoding for the set of multiple DMRS symbols.

Aspect 42: An apparatus for wireless communication at a second device, including: means for transmitting, to a first device, control signaling indicating a use of OTFS precoding for a set of multiple DMRS symbols; and means for transmitting, to the first device and associated with the control signaling, a signal including an OTFS precoded first waveform portion carrying the set of multiple DMRS symbols interleaved with a non-OTFS precoded second waveform portion carrying a set of multiple information symbols.

Aspect 43: The apparatus of aspect 42, where the means for transmitting the control signaling include: means for transmitting an indication of a time dimension and a frequency dimension associated with DMRS resources, where the DMRS resources define the OTFS precoded first waveform portion in a time-frequency domain.

Aspect 44: The apparatus of aspect 43, where the time dimension and the frequency dimension correspond to a comb structure of uniformly spaced subcarriers in a frequency-domain and uniformly spaced symbols in a time-domain within the signal.

Aspect 45: The apparatus of any of aspects 43 or 44, further including: means for performing OTFS encoding of the set of multiple DMRS symbols via an ISFFT, where the OTFS encoding of the set of multiple DMRS symbols transforms the set of multiple DMRS symbols from a delay-Doppler domain to the time-frequency domain to obtain the OTFS precoded first waveform portion.

Aspect 46: The apparatus of aspect 45, where: a ZC sequence or a PN sequence in at least one dimension of the delay-Doppler domain.

Aspect 47: The apparatus of any of aspects 42-46, further including: means for receiving, from the first device, an indication of a capability of the first device to support the OTFS precoding of the set of multiple DMRS symbols.

Aspect 48: The apparatus of any of aspects 42-47, where: the set of multiple information symbols include one or both of data and control signals.

Aspect 49: A non-transitory computer-readable medium storing code for wireless communication at a first device, the code including instructions executable by a processor to: receive, from a second device, control signaling indicating a use of OTFS precoding for a set of multiple DMRS symbols; and receive, from the second device and associated with the control signaling, a signal including an OTFS precoded first waveform portion carrying the set of multiple DMRS symbols interleaved with a non-OTFS precoded second waveform portion carrying a set of multiple information symbols.

Aspect 50: The non-transitory computer-readable medium of aspect 49, where the instructions to receive the control signaling are executable by the processor to: receive an indication of a time dimension and a frequency dimension associated with DMRS resources, where the DMRS resources define the OTFS precoded first waveform portion in a time-frequency domain.

Aspect 51: The non-transitory computer-readable medium of aspect 50, where the time dimension and the frequency dimension correspond to a comb structure of uniformly spaced subcarriers in a frequency-domain and uniformly spaced symbols in a time-domain within the signal.

Aspect 52: The non-transitory computer-readable medium of any of aspects 50 or 51, where the instructions are further executable by the processor to: perform OTFS decoding of the OTFS precoded first waveform portion via a SFFT, where the OTFS decoding of the OTFS precoded first waveform portion transforms the set of multiple DMRS symbols from the time-frequency domain to a delay-Doppler domain.

Aspect 53: The non-transitory computer-readable medium of aspect 52, where the instructions are further executable by the processor to: receive the set of multiple information symbols from the second device in accordance with a delay-Doppler domain channel estimate associated with the set of multiple DMRS symbols in the delay-Doppler domain, where the set of multiple information symbols include one or both of data and control signals.

Aspect 54: The non-transitory computer-readable medium of aspect 53, where the instructions are further executable by the processor to: perform a circular correlation of the set of multiple DMRS symbols in the delay-Doppler domain, where the circular correlation produces the delay-Doppler domain channel estimate.

Aspect 55: The non-transitory computer-readable medium of any of aspects 53 or 54, where the instructions are further executable by the processor to: estimate an ICI from the set of multiple DMRS symbols in the delay-Doppler domain, where one or both of the data and the control signals is received from the second device according to the ICI.

Aspect 56: The non-transitory computer-readable medium of any of aspects 52-55, where: a ZC sequence or a PN sequence in at least one dimension of the delay-Doppler domain.

Aspect 57: The non-transitory computer-readable medium of any of aspects 49-56, where the instructions are further executable by the processor to: transmit, to the second device, an indication of a capability of the first device to support the OTFS precoding for the set of multiple DMRS symbols.

Aspect 58: A non-transitory computer-readable medium storing code for wireless communication at a second device, the code including instructions executable by a processor to: transmit, to a first device, control signaling indicating a use of OTFS precoding for a set of multiple DMRS symbols; and transmit, to the first device and associated with the control signaling, a signal including an OTFS precoded first waveform portion carrying the set of multiple DMRS symbols interleaved with a non-OTFS precoded second waveform portion carrying a set of multiple information symbols.

Aspect 59: The non-transitory computer-readable medium of aspect 58, where the instructions to transmit the control signaling are executable by the processor to: transmit an indication of a time dimension and a frequency dimension associated with DMRS resources, where the DMRS resources define the OTFS precoded first waveform portion in a time-frequency domain.

Aspect 60: The non-transitory computer-readable medium of aspect 59, where the time dimension and the frequency dimension correspond to a comb structure of uniformly spaced subcarriers in a frequency-domain and uniformly spaced symbols in a time-domain within the signal.

Aspect 61: The non-transitory computer-readable medium of any of aspects 59 or 60, where the instructions are further executable by the processor to: perform OTFS encoding of the set of multiple DMRS symbols via an ISFFT, where the OTFS encoding of the set of multiple DMRS symbols transforms the set of multiple DMRS symbols from a delay-Doppler domain to the time-frequency domain to obtain the OTFS precoded first waveform portion.

Aspect 62: The non-transitory computer-readable medium of aspect 61, where: a ZC sequence or a PN sequence in at least one dimension of the delay-Doppler domain.

Aspect 63: The non-transitory computer-readable medium of any of aspects 58-62, where the instructions are further executable by the processor to: receive, from the first device, an indication of a capability of the first device to support the OTFS precoding of the set of multiple DMRS symbols.

Aspect 64: The non-transitory computer-readable medium of any of aspects 58-63, where the set of multiple information symbols include one or both of data and control signals.

Aspect 65: An apparatus for wireless communication at a first device, including: an interface configured to: obtain, from a second device, control signaling indicating a use of OTFS precoding for a set of multiple DMRS symbols; and obtain, from the second device and associated with the control signaling, a signal including an OTFS precoded first waveform portion carrying the set of multiple DMRS symbols interleaved with a non-OTFS precoded second waveform portion carrying a set of multiple information symbols.

Aspect 66: The apparatus of aspect 65, where, to obtain the control signaling, the interface is further configured to: obtain an indication of a time dimension and a frequency dimension associated with DMRS resources, where the DMRS resources define the OTFS precoded first waveform portion in a time-frequency domain.

Aspect 67: The apparatus of aspect 66, where the time dimension and the frequency dimension correspond to a comb structure of uniformly spaced subcarriers in a frequency-domain and uniformly spaced symbols in a time-domain within the signal.

Aspect 68: The apparatus of any of aspects 66 or 67, further including: a processing system configured to: perform OTFS decoding of the OTFS precoded first waveform portion via a SFFT, where the OTFS decoding of the OTFS precoded first waveform portion transforms the set of multiple DMRS symbols from the time-frequency domain to a delay-Doppler domain.

Aspect 69: The apparatus of aspect 68, where the interface is further configured to: obtain the set of multiple information symbols from the second device in accordance with a delay-Doppler domain channel estimate associated with the set of multiple DMRS symbols in the delay-Doppler domain, where the set of multiple information symbols include one or both of data and control signals.

Aspect 70: The apparatus of aspect 69, where the processing system is further configured to: perform a circular correlation of the set of multiple DMRS symbols in the delay-Doppler domain, where the circular correlation produces the delay-Doppler domain channel estimate.

Aspect 71: The apparatus of any of aspects 69 or 70, where the processing system is further configured to: estimate an ICI from the set of multiple DMRS symbols in the delay-Doppler domain, where one or both of the data and the control signals is obtained from the second device according to the ICI.

Aspect 72: The apparatus of any of aspects 68-71, where the set of multiple DMRS symbols correspond to one or more of a ZC sequence or a PN sequence in at least one dimension of the delay-Doppler domain.

Aspect 73: The apparatus of any of aspects 65-72, where the interface is further configured to: output, to the second device, an indication of a capability of the first device to support the OTFS precoding for the set of multiple DMRS symbols.

Aspect 74: An apparatus for wireless communication at a second device, including: an interface configured to: output, to a first device, control signaling indicating a use of OTFS precoding for a set of multiple DMRS symbols; and output, to the first device and associated with the control signaling, a signal including an OTFS precoded first waveform portion carrying the set of multiple DMRS symbols interleaved with a non-OTFS precoded second waveform portion carrying a set of multiple information symbols.

Aspect 75: The apparatus of aspect 74, where, to output the control signaling, the interface is further configured to: output an indication of a time dimension and a frequency dimension associated with DMRS resources, where the DMRS resources define the OTFS precoded first waveform portion in a time-frequency domain.

Aspect 76: The apparatus of aspect 75, where the time dimension and the frequency dimension correspond to a comb structure of uniformly spaced subcarriers in a frequency-domain and uniformly spaced symbols in a time-domain within the signal.

Aspect 77: The apparatus of any of aspects 75 or 76, further including: a processing system configured to: perform OTFS encoding of the set of multiple DMRS symbols via an ISFFT, where the OTFS encoding of the set of multiple DMRS symbols transforms the set of multiple DMRS symbols from a delay-Doppler domain to the time-frequency domain to obtain the OTFS precoded first waveform portion.

Aspect 78: The apparatus of aspect 77, where the set of multiple DMRS symbols correspond to one or more of a ZC sequence or a PN sequence in at least one dimension of the delay-Doppler domain.

Aspect 79: The apparatus of any of aspects 74-78, where the interface is further configured to: obtain, from the first device, an indication of a capability of the first device to support the OTFS precoding of the set of multiple DMRS symbols.

Aspect 80: The apparatus of any of aspects 74-79, where the set of multiple information symbols include one or both of data and control signals.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a first device, comprising:
an interface configured to:
obtain, from a second device, control signaling indicating a use of orthogonal time-frequency space (OTFS) precoding for a plurality of demodulation reference signal (DMRS) symbols; and
obtain, from the second device and associated with the control signaling, a signal comprising an OTFS precoded first waveform portion carrying the plurality of DMRS symbols interleaved with a non-OTFS precoded second waveform portion carrying a plurality of information symbols.

2. The apparatus of claim 1, wherein, to obtain the control signaling, the interface is further configured to:
obtain an indication of a time dimension and a frequency dimension associated with DMRS resources, wherein the DMRS resources define the OTFS precoded first waveform portion in a time-frequency domain.

3. The apparatus of claim 2, wherein the time dimension and the frequency dimension correspond to a comb structure of uniformly spaced subcarriers in a frequency-domain and uniformly spaced symbols in a time-domain within the signal.

4. The apparatus of claim 2, further comprising:
a processing system configured to:
perform OTFS decoding of the OTFS precoded first waveform portion via a symplectic fast Fourier transform (SFFT), wherein the OTFS decoding of the OTFS precoded first waveform portion transforms the plurality of DMRS symbols from the time-frequency domain to a delay-Doppler domain.

5. The apparatus of claim 4, wherein the interface is further configured to:
obtain the plurality of information symbols from the second device in accordance with a delay-Doppler domain channel estimate associated with the plurality of DMRS symbols in the delay-Doppler domain, wherein the plurality of information symbols comprise one or both of data and control signals.

6. The apparatus of claim 5, wherein the processing system is further configured to:
perform a circular correlation of the plurality of DMRS symbols in the delay-Doppler domain, wherein the circular correlation produces the delay-Doppler domain channel estimate.

7. The apparatus of claim 5, wherein the processing system is further configured to:
estimate an inter-carrier interference (ICI) from the plurality of DMRS symbols in the delay-Doppler domain, wherein one or both of the data and the control signals is obtained from the second device according to the ICI.

8. The apparatus of claim 4, wherein the plurality of DMRS symbols correspond to one or more of a Zadoff-Chu (ZC) sequence or a pseudonoise (PN) sequence in at least one dimension of the delay-Doppler domain.

9. The apparatus of claim 1, wherein the interface is further configured to:
output, to the second device, an indication of a capability of the first device to support the OTFS precoding for the plurality of DMRS symbols.

10. An apparatus for wireless communication at a second device, comprising:
an interface configured to:
output, to a first device, control signaling indicating a use of orthogonal time-frequency space (OTFS) precoding for a plurality of demodulation reference signal (DMRS) symbols; and
output, to the first device and associated with the control signaling, a signal comprising an OTFS precoded first waveform portion carrying the plurality of DMRS symbols interleaved with a non-OTFS precoded second waveform portion carrying a plurality of information symbols.

11. The apparatus of claim 10, wherein, to output the control signaling, the interface is further configured to:
output an indication of a time dimension and a frequency dimension associated with DMRS resources, wherein the DMRS resources define the OTFS precoded first waveform portion in a time-frequency domain.

12. The apparatus of claim 11, wherein the time dimension and the frequency dimension correspond to a comb structure of uniformly spaced subcarriers in a frequency-domain and uniformly spaced symbols in a time-domain within the signal.

13. The apparatus of claim 11, further comprising:
a processing system configured to:
perform OTFS encoding of the plurality of DMRS symbols via an inverse symplectic fast Fourier transform (ISFFT), wherein the OTFS encoding of the plurality of DMRS symbols transforms the plurality of DMRS symbols from a delay-Doppler domain to the time-frequency domain to obtain the OTFS precoded first waveform portion.

14. The apparatus of claim 13, wherein the plurality of DMRS symbols correspond to one or more of a Zadoff-Chu (ZC) sequence or a pseudonoise (PN) sequence in at least one dimension of the delay-Doppler domain.

15. The apparatus of claim 10, wherein the interface is further configured to:
obtain, from the first device, an indication of a capability of the first device to support the OTFS precoding of the plurality of DMRS symbols.

16. The apparatus of claim 10, wherein the plurality of information symbols comprise one or both of data and control signals.

17. A method for wireless communication at a first device, comprising:
receiving, from a second device, control signaling indicating a use of orthogonal time-frequency space (OTFS) precoding for a plurality of demodulation reference signal (DMRS) symbols; and
receiving, from the second device and associated with the control signaling, a signal comprising an OTFS precoded first waveform portion carrying the plurality of DMRS symbols interleaved with a non-OTFS precoded second waveform portion carrying a plurality of information symbols.

18. The method of claim 17, wherein receiving the control signaling comprises:
receiving an indication of a time dimension and a frequency dimension associated with DMRS resources, wherein the DMRS resources define the OTFS precoded first waveform portion in a time-frequency domain.

19. The method of claim 18, wherein the time dimension and the frequency dimension correspond to a comb structure of uniformly spaced subcarriers in a frequency-domain and uniformly spaced symbols in a time-domain within the signal.

20. The method of claim 18, further comprising:
performing OTFS decoding of the OTFS precoded first waveform portion via a symplectic fast Fourier transform (SFFT), wherein the OTFS decoding of the OTFS precoded first waveform portion transforms the plurality of DMRS symbols from the time-frequency domain to a delay-Doppler domain.

21. The method of claim 20, further comprising:
receiving the plurality of information symbols from the second device in accordance with a delay-Doppler domain channel estimate associated with the plurality of DMRS symbols in the delay-Doppler domain, wherein the plurality of information symbols comprise one or both of data and control signals.

22. The method of claim 21, further comprising:
performing a circular correlation of the plurality of DMRS symbols in the delay-Doppler domain, wherein the circular correlation produces the delay-Doppler domain channel estimate.

23. The method of claim 21, further comprising:
estimating an inter-carrier interference (ICI) from the plurality of DMRS symbols in the delay-Doppler domain, wherein one or both of the data and the control signals is received from the second device according to the ICI.

24. The method of claim 20, wherein the plurality of DMRS symbols correspond to one or more of a Zadoff-Chu sequence or a pseudonoise (PN) sequence in at least one dimension of the delay-Doppler domain.

25. The method of claim 17, further comprising:
transmitting, to the second device, an indication of a capability of the first device to support the OTFS precoding for the plurality of DMRS symbols.

26. A method for wireless communication at a second device, comprising:
transmitting, to a first device, control signaling indicating a use of orthogonal time-frequency space (OTFS) precoding for a plurality of demodulation reference signal (DMRS) symbols; and
transmitting, to the first device and associated with the control signaling, a signal comprising an OTFS precoded first waveform portion carrying the plurality of DMRS symbols interleaved with a non-OTFS precoded second waveform portion carrying a plurality of information symbols.

27. The method of claim 26, wherein transmitting the control signaling comprises:
transmitting an indication of a time dimension and a frequency dimension associated with DMRS resources, wherein the DMRS resources define the OTFS precoded first waveform portion in a time-frequency domain.

28. The method of claim 27, wherein the time dimension and the frequency dimension correspond to a comb structure of uniformly spaced subcarriers in a frequency-domain and uniformly spaced symbols in a time-domain within the signal.

29. The method of claim 27, further comprising:
performing OTFS encoding of the plurality of DMRS symbols via an inverse symplectic fast Fourier transform (ISFFT), wherein the OTFS encoding of the plurality of DMRS symbols transforms the plurality of DMRS symbols from a delay-Doppler domain to the time-frequency domain to obtain the OTFS precoded first waveform portion.

30. The method of claim 29, wherein the plurality of DMRS symbols correspond to one or more of a Zadoff-Chu sequence or a pseudonoise (PN) sequence in at least one dimension of the delay-Doppler domain.

* * * * *